(12) United States Patent
Komatsu

(10) Patent No.: US 8,717,662 B2
(45) Date of Patent: May 6, 2014

(54) DISPLAY DEVICE AND ELECTRONIC APPARATUS

(75) Inventor: Harunobu Komatsu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 191 days.

(21) Appl. No.: 13/162,982

(22) Filed: Jun. 17, 2011

(65) Prior Publication Data

US 2011/0317249 A1    Dec. 29, 2011

(30) Foreign Application Priority Data

Jun. 29, 2010   (JP) .................................. 2010-147895

(51) Int. Cl.
*G02B 26/00*    (2006.01)

(52) U.S. Cl.
CPC ....................................... *G02B 26/00* (2013.01)
USPC .......................................................... 359/296

(58) Field of Classification Search
USPC ................... 359/290–296; 345/107, 108, 690
See application file for complete search history.

(56) References Cited

U.S. PATENT DOCUMENTS

| 7,075,502 B1* | 7/2006 | Drzaic et al. ..................... 345/55 |
| 7,920,193 B2* | 4/2011 | Ladd et al. ..................... 348/308 |
| 2003/0231162 A1 | 12/2003 | Kishi |
| 2010/0073281 A1* | 3/2010 | Moriyama et al. ............ 345/107 |

FOREIGN PATENT DOCUMENTS

| JP | A-2004-20818 | 1/2004 |
| JP | A-2008-185641 | 8/2008 |
| JP | A-2009-192637 | 8/2009 |

* cited by examiner

*Primary Examiner* — Scott J Sugarman
*Assistant Examiner* — Vipin Patel
(74) *Attorney, Agent, or Firm* — Oliff PLC

(57) ABSTRACT

A display device includes a display layer provided with a cell in which first particles, second particles, and third particle with colors different to each other are contained, a front side electrode provided on the front side of the display layer, and a first and second back side electrodes provided corresponding to the cell on the back side of the display layer. The first particles are charged. The second particles have a color in a complementary color relation to that of the first particles, are charged with the opposite polarity to that of the first particles, and have a smaller amount of charge than that of the first particles. In the display device, a part where the first particles and the second particles are disproportionately located is set with the third particles dispersed in the cell, to change a color in the cell viewed from the front side electrode side.

17 Claims, 13 Drawing Sheets

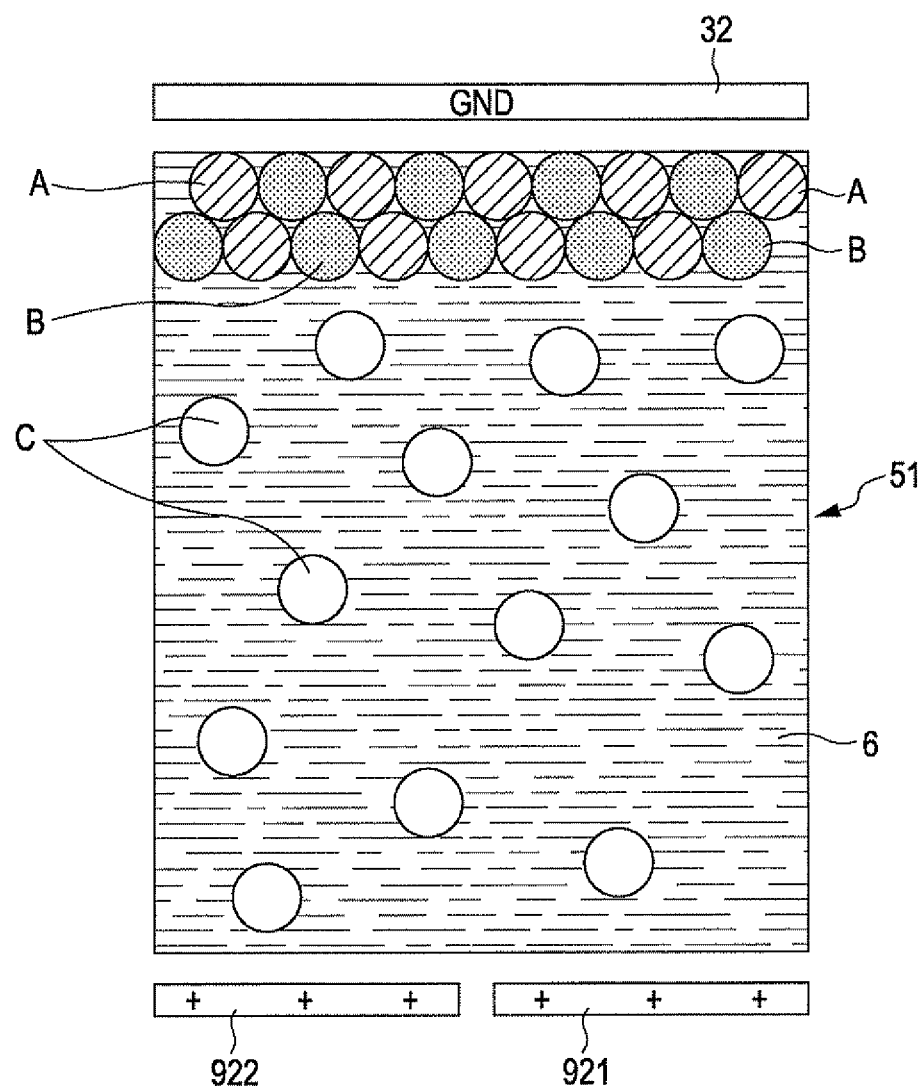

DISPLAY DEVICE AND ELECTRONIC APPARATUS

BACKGROUND

1. Technical Field

The present invention relates to a display device and an electronic apparatus.

2. Related Art

An electrophoretic display using electrophoresis of particles, which constitutes an electronic paper image display unit is known (e.g., see JP-A-2009-192637). The electrophoretic display has excellent portability and power-saving properties, and is particularly suitable as an electronic paper image display unit.

In JP-A-2009-192637, a display device is disclosed, which includes a plurality of cells, two electrodes (upper electrodes) provided on one side (upside) of each cell, and a lower electrode provided on the other side (downside) of each cell. A dispersion liquid formed by dispersing three kinds of particles in a dispersion medium is sealed in each cell. The three kinds of particles include negatively charged black first particles, negatively charged yellow second particles, and positively charged white third particles.

In the display device described in JP-A-2009-192637, a voltage pattern applied among the three electrodes is controlled to be in any of a black display state where the first particles are collected on the upper electrode side, a yellow display state where the second particles are collected on the upper electrode side, and a white display state where the third particles are collected on the upper electrode side.

However, in the display device described in JP-A-2009-192637, the black first particles are collected on the upper electrode side together with the yellow second particles in the yellow display state, and thus, due to the influence of black, it is difficult to display bright yellow, that is, the original color of the second particles. The yellow second particles are collected on the upper electrode side together with the black first particles in the black display state, and thus, due to the influence of yellow, it is difficult to display black with low chroma and low brightness, that is, the original color of the first particles. That is, in the display device described in JP-A-2009-192637, the contrast decreases, the brightness and chroma of chromatic color (yellow) decrease, and thus there is a problem that it is difficult to exhibit excellent display properties.

SUMMARY

An advantage of some aspects of the invention is to provide a display device capable of exhibiting high contrast and displaying clear colors, and an electronic apparatus using the same.

According to an aspect of the invention, there is provided a display device including: a display layer that is provided with a cell in which first particles, second particles, and third particles with different colors from one another are contained; a front side electrode that is provided on the front side of the display layer; and a first back side electrode and a second back side electrode that are provided corresponding to the cell on the back side of the display layer, wherein the first particles are positively or negatively charged, wherein the second particles have a color with a complementary color relation to that of the first particles, are charged with the opposite polarity to that of the first particles and have a smaller amount of charge than that of the first particles, and a voltage application pattern to the front side electrode, the first back side electrode, and the second back side electrode is selected, the selected voltage pattern is applied, and a part where the first particles and the second particles are disproportionately located is set in a state where the third particles are dispersed in the cell, to change a color in the cell viewed from the electrode side.

Accordingly, it is possible to provide a display device capable of exhibiting high contrast and displaying clear colors.

In the display device according to the aspect of the invention, it is preferable that the third particles not be either positively or negatively charged.

Accordingly, a state where the third particles are dispersed in the cell is possible.

In the display device according to the aspect of the invention, it is preferable that the first back side electrode is made to have a higher potential than the front side electrode and the second back side electrode is made to have a lower potential than the front side electrode, to disproportionately locate the first particles and the second particles on the back side of the cell, thereby being in a third particle color display state where the color of the third particles is viewed from the front side.

Accordingly, it is possible to smoothly display the color of the third particles.

In the display device according to the aspect of the invention, it is preferable that a voltage with the opposite polarity to that of the first particles is applied to the front side electrode or a voltage with the opposite polarity to that of the second particles is applied to at least one of the first back side electrode and the second back side electrode, to disproportionately locate the first particles on the front side of the cell and to disproportionately locate the second particles on the back side of the cell, thereby being in a first particle color display state where the color of the first particles is viewed from the front side.

Accordingly, it is possible to display the color of the first particles. Since the second particles are collected on the back side electrode, it is possible to prevent the color of the second particles from having an influence on the display color and to display the original color of the first particles.

In the display device according to the aspect of the invention, it is preferable that the magnitude of an electric field occurring in the first particle color display state is larger than the attraction force in which an electrostatic force acting on the first particles through the electric field holds the first particles to an inner face of the cell, and is larger than the attraction force in which an electrostatic force acting on the second particles holds the second particles to the inner face of the cell.

Accordingly, it is possible to more reliably move the first particles and the second particles in a desired direction.

In the display device according to the aspect of the invention, it is preferable that a voltage with the same polarity as that of the first particles is applied to the front side electrode or a voltage with the same polarity as that of the second particles is applied to at least one of the first back side electrode and the second back side electrode, to disproportionately locate the second particles on the front side of the cell and to disproportionately locate the first particles on the back side of the cell, thereby being in a second particle color display state where the color of the second particles is viewed from the front side.

Accordingly, it is possible to display the color of the second particles. Since the first particles are collected on the back side electrode, it is possible to prevent the color of the first particles from having an influence on the display color and to display the original color of the first particles.

In the display device according to the aspect of the invention, it is preferable that the magnitude of an electric field occurring in the second particle color display state is larger than an attraction force in which an electrostatic force acting on the first particles through the electric field holds the first particles to an inner face of the cell, and is larger than an attraction force in which an electrostatic force acting on the second particles holds the second particles to the inner face of the cell.

Accordingly, it is possible to more reliably move the first particles and the second particles in a desired direction.

In the display device according to the aspect of the invention, it is preferable that a voltage with the opposite polarity to that of the first particles is applied to the first back side electrode and the second back side electrode in the second particle color display state, to move the first particles to the display side of the cell with the second particles disproportionately located on the front side of the cell, and to disproportionately locate the first particles and the second particles on the front side of the cell, thereby being in a black display state where black that is a mixed color of the first particles and the second particles is viewed from the front side.

Accordingly, it is possible to smoothly move both of the first particles and the second particles to the display side.

In the display device according to the aspect of the invention, it is preferable that the magnitude of an electric field acting on the first particles and the second particles in the black display state is smaller than that of an electric field acting on the first particles and the second particles in the second particle color display state.

Accordingly, it is possible to move the first particles toward the front side electrode with the second particles staying on the front side electrode side.

In the display device according to the aspect of the invention, it is preferable that the magnitude of an electric field occurring in the black display state is larger than an attraction force in which an electrostatic force acting through the electric field holds the first particles to an inner face of the cell, and is smaller than an attraction force in which an electrostatic force acting on the second particles holds the second particles to the inner face of the cell.

Accordingly, it is possible to more reliably make the second particles stay on the front side electrode side.

In the display device according to the aspect of the invention, it is preferable that the first particles and the second particles are disproportionately located on the front side of the cell, and then an alternating voltage is applied between the front side electrode and the first back side electrode and the second back side electrode, and through vibration of the first particles and the second particles in the thickness direction of the display layer, enter a mixed state where the first particles and the second particles are mixed.

Accordingly, it is possible to display black with lower chroma and lower brightness.

In the display device according to the aspect of the invention, it is preferable that the magnitude of an electric field occurring in the mixed state is larger than the attraction force in which an electrostatic force acting on the first particles through the electric field holds the first particles to an inner face of the cell, and is larger than the attraction force in which an electrostatic force acting on the second particles holds the second particles to the inner face of the cell.

Accordingly, it is possible to efficiently vibrate the first particles and the second particles.

In the display device according to the aspect of the invention, it is preferable that the color of the first particles is cyan, magenta, yellow, red, green, or blue.

Accordingly, it is possible to display the colors.

In the display device according to the aspect of the invention, it is preferable that the color of the third particles is white.

Accordingly, it is possible to display white and to exhibit high contrast.

In the display device according to the aspect of the invention, it is preferable that one pixel is configured by at least three cells, and it is preferable that one side of the first particles and the second particles contained in the first cell included in at least the three cells is red, the other side is cyan, one side of the first particles and the second particles contained in the second cell is green, the other side is magenta, one side of the first particles and the second particles contained in the third cell is blue, and the other side is yellow.

Accordingly, it is possible to display full color.

According to another aspect of the invention, there is provided a display device including: a display layer that is provided with a cell in which first particles, second particles, and third particles are contained; a front side electrode that is provided on one side of the display layer; and a first back side electrode and a second back side electrode that are provided on the other side of the display layer, wherein the first particles are positively charged, wherein the second particles have a color with a complementary color relation to that of the first particles, are negatively charged, and have a smaller amount of charge than that of the first particles, wherein the third particles are different in color from the first particles and the second particles, wherein the front side electrode is made to have a higher potential than those of the first back side electrode and the second back side electrode, to be in a first state of disproportionately locating the first particles to the other side of the cell and disproportionately locating the second particles to the one side of the cell, and wherein the front side electrode is made to have a lower potential than those of the first back side electrode and the second back side electrode, and the difference in potential between the front side electrode and the first back side electrode and the second back side electrode is made smaller than that of the first state, to be in a second state of disproportionately locating the first particles to the one side of the cell with the second particles disproportionately located to the one side of the cell.

Accordingly, it is possible to provide the display device capable of exhibiting high contrast and displaying clear colors.

According to still another aspect of the invention, there is provided a display device including: a display layer that is provided with a cell in which first particles, second particles, and third particles are contained; a front side electrode that is provided on one side of the display layer; and a first back side electrode and a second back side electrode that are provided on the other side of the display layer, wherein the first particles are negatively charged, wherein the second particles have a color with a complementary color relation to that of the first particles, are positively charged, and have a smaller amount of charge than that of the first particles, wherein the third particles are different in color from the first particles and the second particles, wherein the front side electrode is made to have a lower potential than those of the first back side electrode and the second back side electrode, to be in a first state of disproportionately locating the first particles to the other side of the cell and disproportionately locating the second particles to the one side of the cell, and wherein the front side electrode is made to have a higher potential than those of the first back side electrode and the second back side electrode, and the difference in potential between the front side electrode and the first back side electrode and the second back side electrode is made smaller than that of the first state, to be in a second state of disproportionately locating the first particles to the one side of the cell with the second particles disproportionately located to the one side of the cell.

Accordingly, it is possible to provide the display device capable of exhibiting high contrast and displaying clear colors.

According to still another aspect of the invention, there is provided an electronic apparatus provided with any one of the display devices.

Accordingly, it is possible to provide the electronic apparatus capable of exhibiting high contrast and displaying clear colors.

BRIEF DESCRIPTION OF THE DRAWINGS

The invention will be described with reference to the accompanying drawings, wherein like numbers reference like elements.

FIG. 10 is a schematic diagram illustrating an operation of the display device shown in FIG. 1.

DESCRIPTION OF EXEMPLARY EMBODIMENTS

Hereinafter, a display device and an electronic apparatus according to the invention will be described in detail on the basis of embodiments shown in the accompanying drawings.
First Embodiment First, a first embodiment of the display device of the invention will be described.

Figure 1:
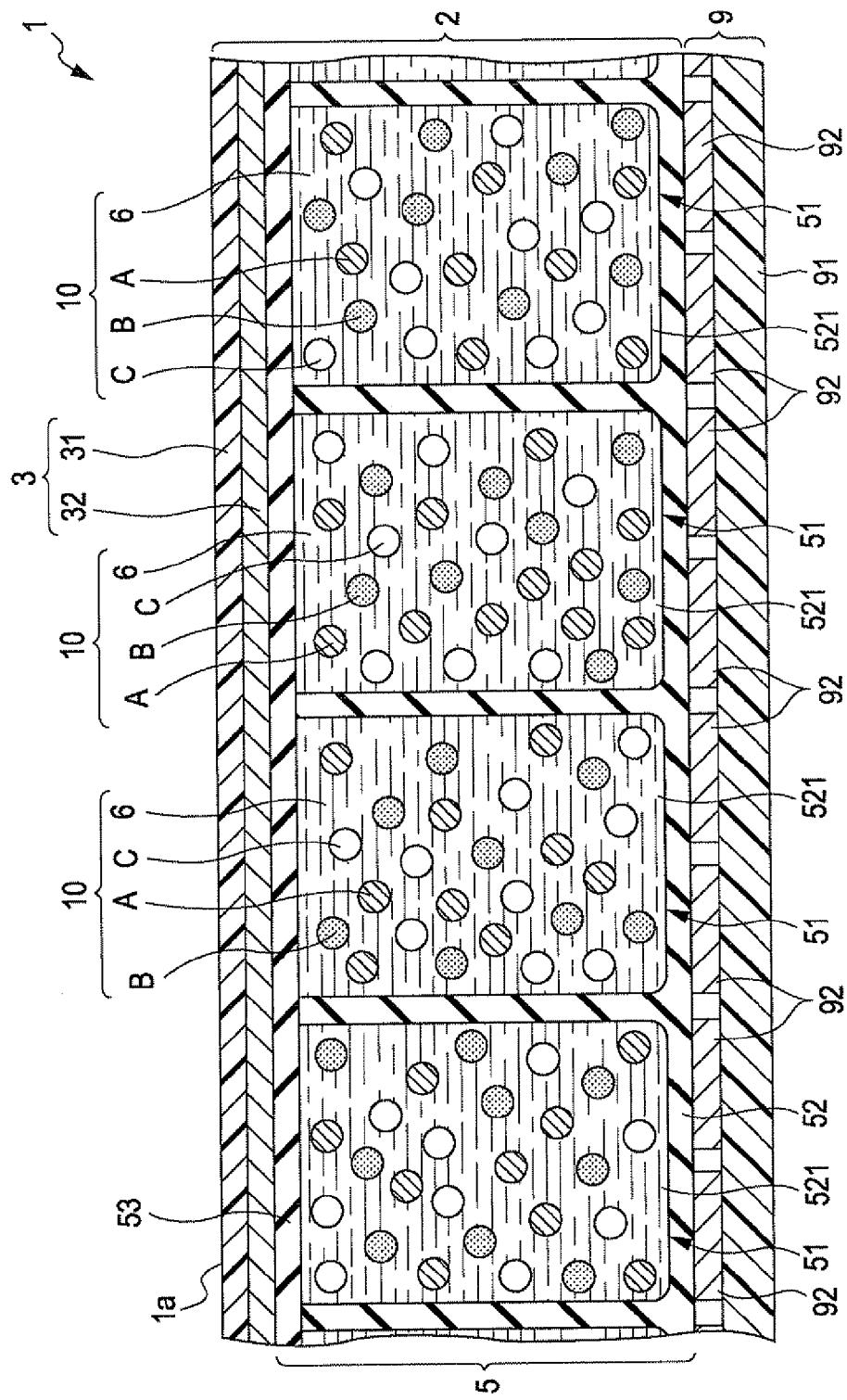
FIG. 1 is a cross-sectional view schematically illustrating a display device according to a first embodiment of the invention.
Figure 2:
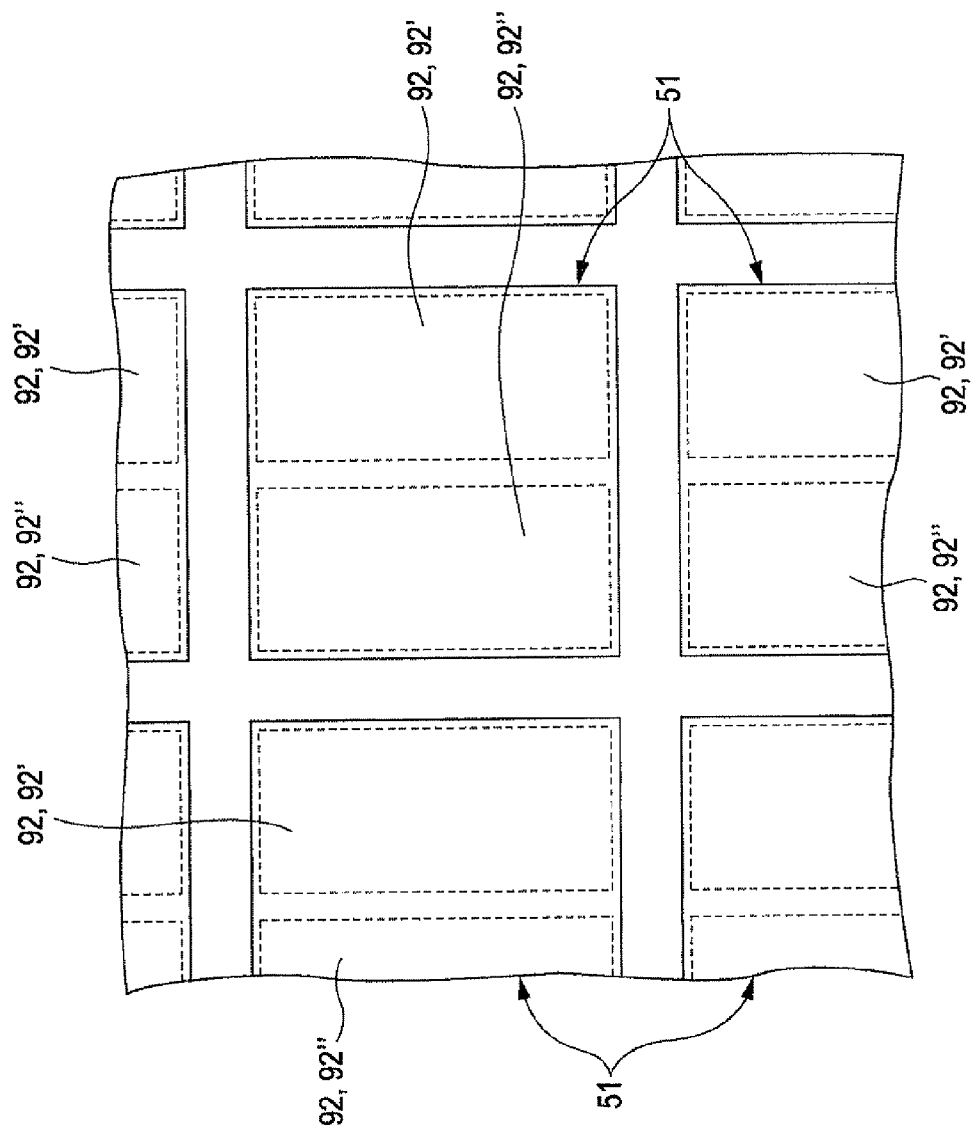
FIG. 2 is a plan view illustrating the display device shown in FIG. 1.
Figure 3A:
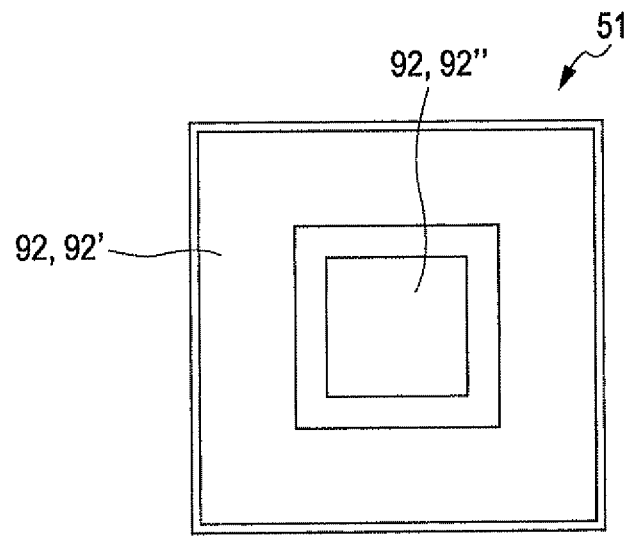
FIG. 3A and FIG. 3B are plan views illustrating a modified example of a display side electrode shown in FIG. 2.
Figure 3B:
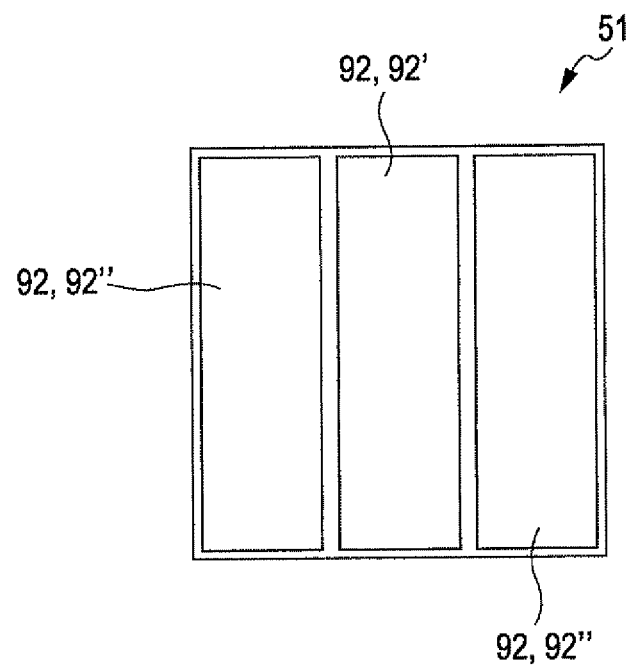
Figure 4:
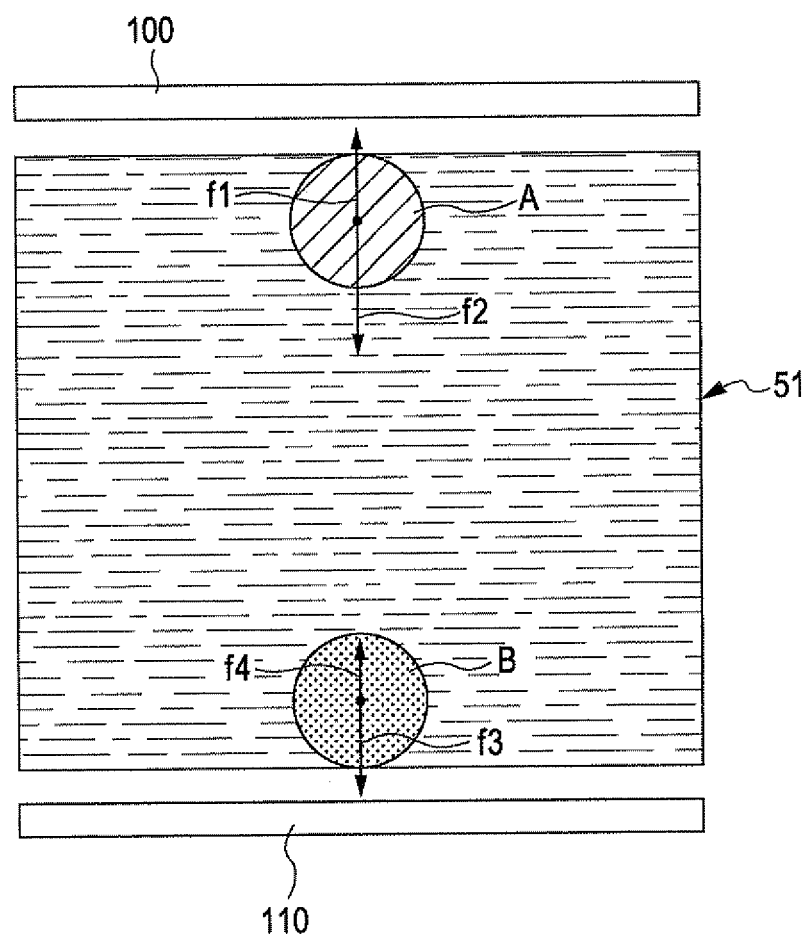
FIG. 4 is a schematic diagram illustrating a first particle and a second particle.

FIG. 1 is a cross-sectional view schematically illustrating the display device according to the first embodiment of the invention, FIG. 2 is a plan view of the display device shown in FIG. 1, FIG. 3A and FIG. 3B are plan views illustrating modified examples of a front side electrode shown in FIG. 2, FIG. 4 is a schematic diagram illustrating a first particle and a second particle, FIG. 5A, FIG. 5B, FIG. 5C, FIG. 9A, and FIG. 9B are diagrams illustrating operation voltages of the display device shown in FIG. 1, and FIG. 6, FIG. 7, FIG. 8, and FIG. 10 are schematic diagrams illustrating an operation of the display device shown in FIG. 1. Hereinafter, for description, the upside of FIG. 1 is "upper" and the downside is "lower".
1. Configuration of Display Device The display device 1 shown in FIG. 1 is provided with a display sheet (front plane) 2, and a circuit board (back plane) 9.

The display sheet 2 is provided with a substrate 3, and a display layer 5 provided on the lower face of the substrate 3. The substrate 3 is provided with a sheet-shaped (flat plate shape) base portion 31, and a display side electrode (front side electrode) 32 formed on the lower face of the base portion 31.

The circuit board 9 on one side is provided with a sheet-shaped (flat plate shape) base portion 91, a circuit (not shown) including a switching element such as a TFT provided on the base portion 91, and a plurality of back side electrodes 92 connected to the switching element.

Hereinafter, these units will be sequentially described in detail.
Display Layer The display layer 5 is provided with a plurality of cells (accommodation unit) 51 in which a dispersion liquid 10 is sealed. In the embodiment, the plurality of cells 51 are provided in a matrix. In the embodiment, one cell 51 constitutes one pixel. The plurality of cells 51 may be arranged, for example, in a honeycomb shape.

The display layer 5 is formed in a sheet shape and is provided with a base body 52 having a plurality of concave portions 521 opened to an upper face (one side), and a cover 53 liquid-tightly bonded to the base body 52 to cover the concave portions 521. A space defined by the inner face of the concave portion 521 and the lower face of the cover 53 constitutes the cell 51. The cover 53 is substantially colorless and transparent, and it is possible to view the inside of the cell 51 through the cover 53.

The base body 52 and the cover 53 have an insulating property and non-permeability to the dispersion liquid 10, respectively. Constituent materials of the base body 52 and the cover 53 are not particularly limited, for example, polyethylene, polypropylene, polyolefins such as ethylene-polyvinyl acetate copolymer, denatured polyolefin, polyamide (e.g., nylon 6, nylon 66), styrene group, polyvinyl chloride group, polyurethane group, polyester group, epoxy group, fluorine rubber group, and various kinds of thermoplastic elastomer chlorinated polyethylene groups, or copolymers, a blend body, and polymer alloys mainly including these, and the like, and one kind of these materials may be used, and two or more kinds of material may be mixed.

In the dispersion liquid 10 sealed in each cell 51, three kinds of particles (the first particles A, the second particles B, and the third particles C) are dispersed in the dispersion medium 6.

It is preferable that the dispersion medium 6 is substantially colorless and transparent. It is preferable that the dispersion medium 6 has a relatively high insulating property. The dispersion medium 6 may be, for example, alcohols such as methanol, ethanol, and butanol, cellosolves such as methyl cellosolve, esters such as methyl acetate and ethyl acetate, ketones such as acetone and methyl ethyl ketone, aliphatic hydrocarbons such as pentane, alicyclic hydrocarbons such as cyclohexane, aromatic hydrocarbons such as benzene having long-chain alkyl group such as benzene and toluene, halogenated hydrocarbons such as methylene chloride and chloroform, aromatic heterocycles such as pyridine and pyrazine, nitriles such as acetonitrile and propionitrile, amides such as N,N-dimethylformamide, mineral oils such as carboxylate and liquid paraffin, vegetable oils such as linoleic acid, linolenic acid, and oleic acid, silicone oils such as dimethyl silicone oil, methyl phenyl silicone oil, and methyl hydrogen silicone oil, fluorine-based liquids such as hydrofluoro ether, or other various kinds of oils, and they may be independently used or used as a mixture.

In the dispersion medium 6, various kinds of additive agents, for example, an electrolyte, a surfactant, a metal soap, a resin material, a rubber material, an oil, a varnish, a charge controlling agent formed of particles such as a compound, a dispersing agent such as a titanium-based coupling agent, an aluminum-based coupling agent, and a silane-based coupling agent, a lubricant, and a stabilizing agent may be added as necessary.

In the dispersion medium 6, as described above, the first particles A, the second particles B, and the third particles C are dispersed.

The first particles A are positively charged particles. The second particles B are negatively charged particles, and have a smaller amount of charge (absolute value) than that of the first particles A. The third particles are uncharged particles which are not substantially charged. The compositions of the first particles A and the second particles B are not limited thereto, the first particles A may be negatively charged particles, the second particles B may be positively charged particles, and the amount of charge thereof may be smaller than that of the first particles A. In the specification, the "uncharged particle" means a particle which does not move according to the electric field even when an electric field to be described later acts. If it has such a property, it may be positively or negatively charged.

Since all of the first particles A and the second particles B among the three kinds of particles A to C are particles having charge, they electrophorese (move) in the dispersion medium 6 according to an electric field generated between the display side electrode 32 and the back side electrode 92 to be described later. Since the third particles C do not have charge, the state dispersed in the dispersion medium 6 is kept irrespective of generation of an electric field between the display side electrode 32 and the back side electrode 92.

The first particles A, the second particles B, and the third particles C are different in color from each other.

The third particles C are white. Since the third particles C that are the uncharged particles are white, it is possible to display brighter white to be described later.

The first particles A and the second particles B have colors with a complementary color relation to each other. Accordingly, it is possible to display black using the first particles A and the second particles B to be described later. Specifically, for example, one side of the first particles A and the second particles B may be red and the other side may be cyan, one side may be green and the other side may be magenta, and one side may be blue and the other side may be yellow.

Hereinafter, for convenience of description, a configuration in which the first particles A are red and the second particles B are cyan will be representatively described.

If the first particles A, the second particles B, and the third particles C are positively charged, negatively charged, and not charged, respectively, any particles can be used, and are not particularly limited. However, at least one kind of pigment particles, resin particles, ceramics particles, metal particles, metal oxide particles, or complex particles thereof is preferably used. Such particles have an advantage in that, along with being easy to produce, it is relatively easy to perform the charge control.

Pigments constituting the pigment particles may be, for example, a black pigment such as aniline black, carbon black, and titanium black, a white pigment such as titanium dioxide, antimony trioxide, zinc sulfide, and zinc oxide, an azoic pigment such as a monoazo, a disazo, and a polyazo, a yellow pigment such as isoindolinone, chrome yellow, yellow iron oxide, cadmium yellow, and titanium yellow, an azoic pigment such as a monoazo, a disazo, and a polyazo, a red pigment such as quinacridone red and chrome vermilion, a blue pigment such as phthalocyanine blue, indanthrene blue, iron blue, ultramarine blue, and cobalt blue, a green pigment such as phthalocyanine green, and one or two or more kinds thereof may be combined.

A resin material constituting the resin particles may be, for example, acrylic resin, urethane resin, urea resin, epoxy resin, rosin resin, polystyrene, polyester, and a resin formed by copolymerizing styrene and acrylonitrile, and one or two or more kinds thereof may be combined.

The complex particles may be, for example, particles formed by coating the surface of pigment particles with a resin material, particles formed by coating the surface of resin particles with pigment, and particles formed of a mixture formed by mixing pigment and a resin material at a suitable composition ratio.

To improve the dispersion property of the first particles A, the second particles B, and the third particles C in the dispersion medium 6, macromolecules highly compatible with the dispersion medium 6 may be physically absorbed and attached or may be chemically bonded to the surfaces of the particles A to C. Among these, it is particularly preferable that the macromolecules are chemically bonded, due to the problem of detachment from the surfaces of the particles A to C. In the configuration, the apparent specific gravity of the particles A to C acts in the direction of decrease, and it is possible to improve the affinity property of the particles A to C in the dispersion medium 6, that is, a dispersion property.

An average particle diameter of the first particles A, the second particles B, and the third particles C is not particularly limited but is preferably 0.1 to 10 μm and more preferably 0.1 to 7.5 μm. When the average particle diameter of the particles A to C is too small, it is difficult to obtain a sufficient occlusion ratio mainly with respect to visible rays, and thus display contrast of the display device 1 may decrease. When the average particle diameter of the particles A to C is too large, they may be easily precipitated in the dispersion medium 6, and thus a problem where the display quality of the display device 1 deteriorates may occur according to kinds thereof. The "average particle diameter" means the volume average particle diameter measured by a dynamic light scattering particle size distribution measuring device (e.g., product name: LB-500 manufactured by Horiba, Ltd.)

It is preferable that the specific gravity of the first particles A, the second particles B, and the third particles C is set to be substantially equal to the specific gravity of the dispersion medium 6. Accordingly, the particles A to C can stay for a long time at a certain position in the dispersion medium 6 even after the applying of a voltage between the display side electrode 32 and the back side electrode 92 is stopped. That is, a memory property is given to the display device 1, and it is possible to keep the display information for a long time. Accordingly, it is possible to achieve power savings in the display device 1.

The display layer 5 has been described above.

The substrate 3 is provided on the upper face of the display layer 5, and the circuit board 9 is provided on the lower face. That is, the display layer 5 is pinched between the substrate 3 and the circuit board 9. As described above, the substrate 3 has the sheet-shaped base portion 31, and the display side electrode 32 provided on the lower face (face on the display layer 5 side) of the base portion 31, and the circuit board 9 has the sheet-shaped base portion 91, and the plurality of back side electrodes 92 provided on the upper face (face on the display layer 5 side) of the base portion 91.

In the embodiment, the surface of the substrate 3 is a display face (a face on which an image is displayed) 1a of the display device 1.

The base portions 31 and 91 may have flexibility or rigidity, but it is preferable to have flexibility. The base portions 31 and 91 having flexibility are used to obtain the display device 1 having flexibility.

When the base portions 31 and 91 have flexibility, a constituent material thereof may be, for example, polyester such as PET (polyethylene terephthalate) and PEN (polyethylene naphthalate), polyolefins such as polyethylene, various kinds of thermoplastic elastomers such as denatured polyolefins, polyamides, thermoplastic polyimides, polyethers, polyether ether ketone, polyurethanes, chlorinated polyethylenes, or copolymers, a blend body, and polymer alloys mainly including these, and the like.

An average thickness of the base portions 31 and 91 is appropriately set according to constituent materials and uses, and is not particularly limited. However, when it has flexibility, it is preferably 20 μm or more and 500 μm or less, and more preferably 25 μm or more and 250 μm or less. Accordingly, it is possible to make the display device 1 small (thin) while achieving a combination of flexibility and strength in the display device 1.

The display side electrode 32 formed on the base portion 31 is provided to overlap with each cell 51 in the plan view of the display device 1.

The plurality of the back side electrode 92 formed on the base portion 91 is provided in a matrix. The plurality of back side electrodes 92 is provided to position two back side electrodes 92 (i.e., two back side electrodes 92 with respect to one cell 51) on each cell 51.

If the constituent material of the display side electrode 32 and the back side electrodes 92 has substantially conductivity, it is not particularly limited, for example, various conductive materials of a metal material such as gold, silver, copper, aluminum, and an alloy material including these, a carbon-based material such as carbon black, an electronic conductive high-molecular-weight material such as polyacetylene, polyfluorene, and derivatives thereof, an ion conductive high-molecular-weight material in which an ionic substance such as NaCl and $Cu(CF_3SO_3)_2$ is dispersed in a matrix resin such as polyvinyl alcohol and polycarbonate, and a conductive oxide material such as indium oxide (IO), indium tin oxide (ITO), and fluorine-doped tin oxide (FTO) may be used, and one or two or more kinds thereof may be combined.

As shown in FIG. 2, the two back side electrodes 92 (92' and 92") provided corresponding to one cell 51 have substantially the same shape (rectangular), and are provided separately in a short-side direction, but the shape and disposition of two back side electrodes 92' and 92" are not limited thereto. For example, when two back side electrodes 92' and 92" are electrically isolated, the back side electrode 92" may be provided inside the frame-shaped back side electrode 92' as shown in FIG. 3A, and the back side electrode 92" divided into two parts to be opposed with the back side electrode 92' interposed therebetween, which is provided at the center of the cell 51, may be provided as shown in FIG. 3B.

2. Operation of Display Device

The display device 1 operates as follows. Hereinafter, for convenience of description, one cell 51 (one pixel) will be representatively described. One side of two back side electrodes 92 provided corresponding to one cell 51 is referred to as "back side electrode (first back side electrode) 921", and the other side is referred to as "back side electrode (second back side electrodes) 922".

In the display device 1, a voltage is independently applied to three electrodes (display side electrode 32, back side electrodes 921 and 922). Specifically, for three independent electrodes 32, 921, and 922, the display device 1 has a ground state (voltage of 0 V is applied), a positive potential state in which a positive voltage of predetermined magnitude (e.g., +15 V) is applied, and a negative potential state in which a negative voltage of predetermined magnitude (e.g., −15 V) is applied.

If the potentials of the electrodes 32, 921, and 922 can be in three different states, the states may not be the positive potential state, the ground state, and the negative potential state, for example, voltages of 30 V, 20 V, and 10 V may be applied to the electrodes 32, 921, and 922.

The magnitude of the voltage (potential difference among electrodes 32, 921, and 922) applied in the positive potential state of the electrodes 32, 921, and 922, and the magnitude of a voltage applied in the negative potential state of the electrodes 32, 921, and 922; in other words, the amount of charge of the first particles and the amount of charge of the second particles B are determined as follows. Herein, for convenience of description, the description is made using a model shown in FIG. 4, that is, a model in which the sealed cell 51 with the dispersion liquid 10 is pinched between a pair of electrode 100 and 110. In FIG. 4, for convenience of description, the third particles C are not shown, and only one particle each is shown for the first particles A and the second particles B. The electrode 100 of the model shown in FIG. 4 corresponds to the display side electrode 32, and the electrode 110 corresponds to the back side electrodes 921 and 922.

In the state shown in FIG. 4, the first particle A comes in contact with the inner face of the cell 51. For this reason, an attraction force (absorption energy) f1 holding the first particle A to the inner face of the cell 51 is generated between the first particle A and the inner face of the cell 51. Accordingly, to separate the first particle A from the inner face of the cell 51, an electrostatic force (escaping energy) f2 acting on the first particle A through an electric field generated by applying a voltage between the pair of electrodes 100 and 110 has to be larger than the absorption energy f1.

Similarly, the second particle B also comes in contact with the inner face of the cell 51. For this reason, an attraction force (absorption energy) f3 holding the second particle B to the inner face of the cell 51 is generated between the second particle B and the inner face of the cell 51. Accordingly, to separate the second particle B from the inner face of the cell 51, an electrostatic force (escaping energy) f4 acting on the second particle B through an electric field generated by applying voltage between the pair of electrodes 100 and 110 has to be larger than the absorption energy f3.

As described above, the amount of charge (absolute value) of the second particle B is smaller than that of the first particle A. Accordingly, when the voltage is applied between the electrodes 100 and 110 to make the same electric field act on the first particle A and the second particle B, the escaping energy f4 acting on the second particle B through the electric field is smaller than the escaping energy f2 acting on the first particle A.

In the embodiment, the amount of charge of the first particle A and the amount of charge of the second particle B are set such that 1) in the first electric field (i.e. an electric field of potential difference 2x V) generated by making the electrode 100 have the/positive potential state (e.g., +x V) and the electrode 110 have the negative potential state (e.g., −xV), the escaping energy f2 acting on the first particle A becomes larger than the absorption energy f1 holding the first particle A to the inner face of the cell 51, the escaping energy f4 acting on the second particle B becomes larger than the absorption energy f3 holding the second particle B to the inner face of the cell 51, and 2) in the second electric field (i.e., an electric field of potential difference x V) generated by making the electrode 100 have the ground state (0 V) and making the electrode 110 have the negative potential state (e.g., −x V), the escaping energy f2 acting on the first particle A becomes larger than the absorption energy f1 holding the first particle A to the inner face of the cell 51, but the escaping energy f4 acting on the second particle B becomes smaller than the absorption energy f3 holding the second particle B to the inner face of the cell 51. Accordingly, the display device 1 can more reliably and smoothly perform the operation to be described later.

In other words, in the embodiment, 1) the strength of the first electric field, that is, the potential difference of the electrodes 100 and 110 is set such that the escaping energy f2 acting on the first particle A becomes larger than the absorption energy f1 holding the first particle A to the inner face of the cell 51, and the escaping energy f4 acting on the second particle B becomes larger than the absorption energy f3 holding the second particle B to the inner face of the cell 51, and 2) the strength of the second electric field, that is, the potential difference of the electrodes 100 and 110 is set such that the escaping energy f2 acting on the first particle A becomes larger than the absorption energy f1 holding the first particle A to the inner face of the cell 51, but the escaping energy f4 acting on the second particle B becomes smaller than the absorption energy f3 holding the second particle B to the inner face of the cell 51.

In the display device 1, the cell 51 can be in the black display state where black is displayed on the display face 1a, the white display state where white is displayed on the display face 1a, the red display state where red is displayed on the display face 1a, or the cyan display state where cyan is displayed on the display face 1a. Hereinafter, the black display state, the white display state, the red display state, and the cyan display state will be sequentially described.

White Display State (Third Particle Color Display State)

Figure 5A:
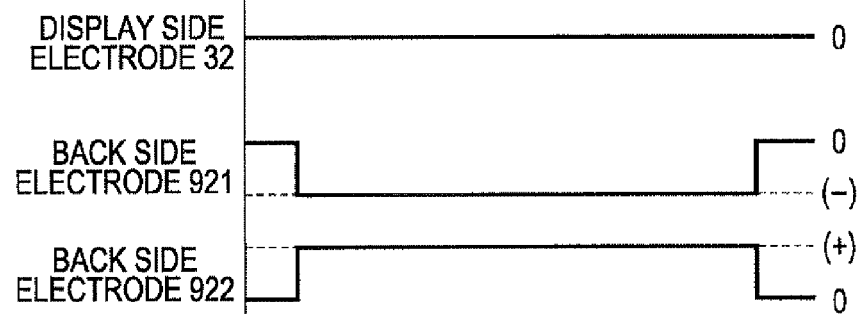
FIG. 5A to FIG. 5C are diagrams illustrating operation voltages of the display device shown in FIG. 1.
Figure 6:
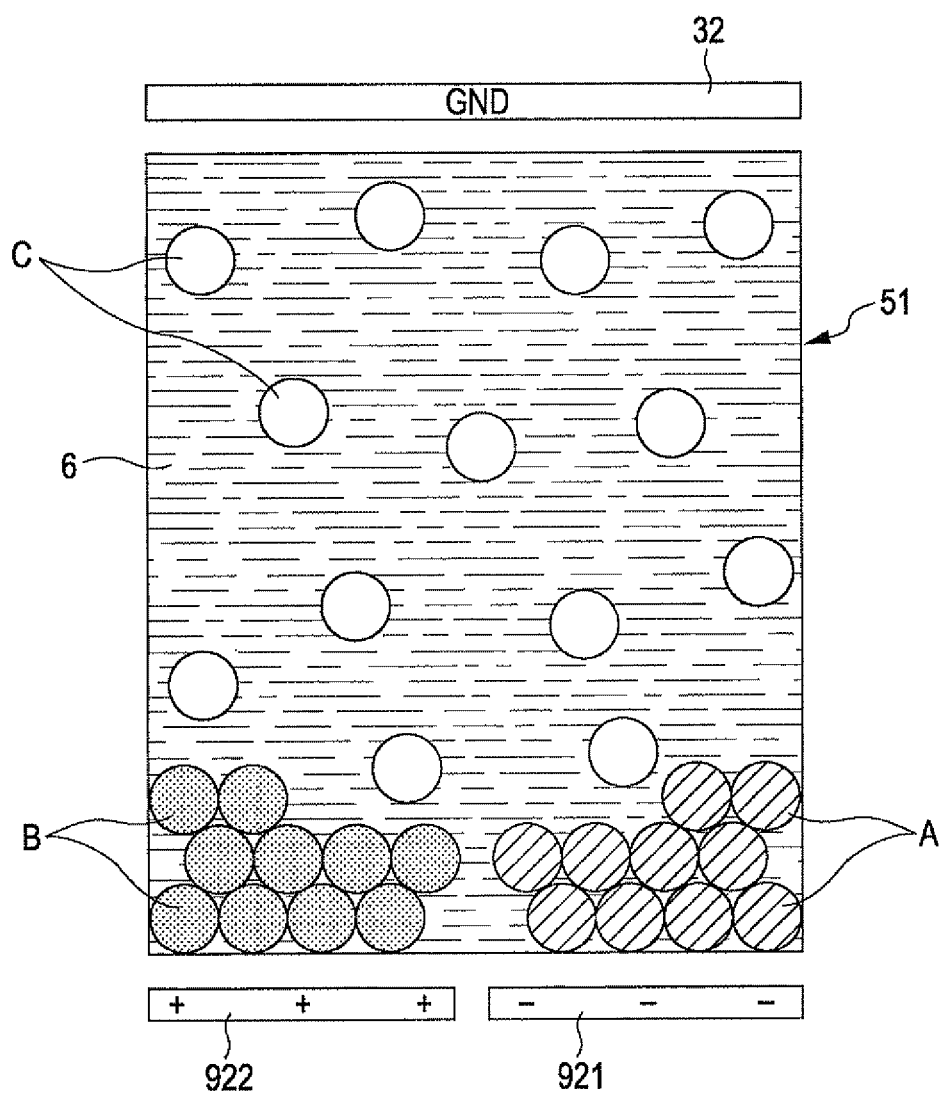
FIG. 6 is a schematic diagram illustrating an operation of the display device shown in FIG. 1.

The voltage shown in FIG. 5A is applied to three electrodes 32, 921, and 922. That is, the voltage making the back side electrode 921 have the negative potential state (lower potential than the display side electrode 32) and making the back side electrode 922 have the positive potential state (higher potential than the display side electrode 32) is applied while the display side electrode 32 is in the ground state (0 V). Then, as shown in FIG. 6, the positively charged first particles A move toward the back side electrode 921 in the dispersion medium 6, and are collected on the back side electrode 921 side. The negatively charged second particles B move toward the back side electrode 922 in the dispersion medium 6, and are collected on the back side electrode 922 side. The third particles C keep the state of being dispersed in the dispersion medium 6.

Accordingly, the third particles C are dispersed in the cell 51 (dispersion medium 6), and the first particles A and the second particles B are covered with the third particles C when viewing the cell 51 from the display face 1a side. As a result, in such a state, white that is the color of the third particles C is displayed on the display face 1a.

As shown in FIG. 6, it is possible to efficiently reflect and diffuse external light input into the cell 51 through the substrate 3 by dispersing the third particles C in the dispersion medium 6, and it is possible to display brighter white, for example, as compared with the case of displaying white by disproportionately locating the third particles C on the display side electrode 32 side. As a result, it is possible to exhibit higher contrast.

Red Display State (First Particle Display State)

Figure 5B:
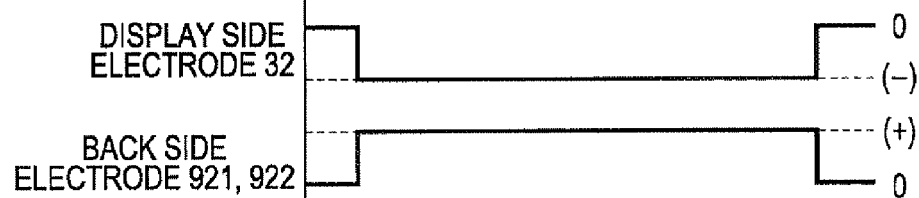
Figure 7:
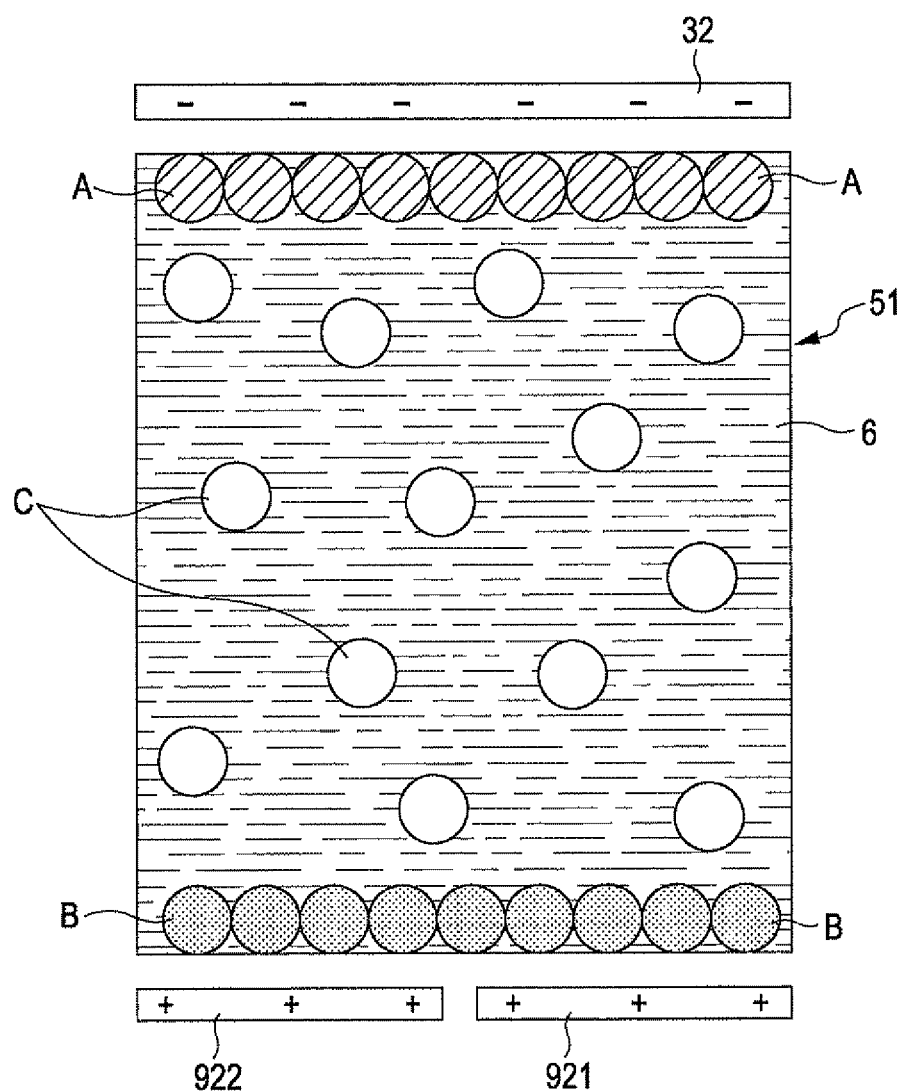
FIG. 7 is a schematic diagram illustrating an operation of the display device shown in FIG. 1.

The voltage shown in FIG. 5B is applied to three electrodes 32, 921, and 922. That is, the voltage making the display side electrode 32 have the negative potential state and making the back side electrodes 921 and 922 have the positive potential state (higher potential than the display side electrode 32) is applied. Then, as shown in FIG. 7, the positively charged first particles A move toward the display side electrode 32 in the dispersion medium 6, and are collected on the display side electrode 32 side. The negatively charged second particles B move toward the back side electrodes 921 and 922 in the dispersion medium 6, and are collected on the back side electrodes 921 and 922 side. The third particles C keep the state of being dispersed in the dispersion medium 6. Accordingly, red that is the color of the first particles A is displayed on the display face 1a.

The escaping energy f2 acting on the first particles A through the electric field generated by applying the voltage shown in FIG. 5B to three electrodes 32, 921, and 922 is larger than the absorption energy f1 holding the first particles A to the inner face of the cell 51, and the escaping energy f4 acting on the second particles B is also larger than the absorption energy f3 holding the second particles B to the inner face of the cell 51. Accordingly, it is possible to smoothly attain the red display state from any state of the states (states shown in FIG. 1) where the first particles A and the second particles B are dispersed in the dispersion medium 6, the white display state, and the cyan display state or the black display state to be described later.

In the red display state, the second particles B are collected on the back side electrodes 921 and 922, that is, a position far away from the display face 1a, and the white third particles C are dispersed between the first particles A and the second particle B. For this reason, the external light passing through the first particles A can be reflected and diffused by the third particles C before reaching the second particles B. As a result, it is possible to prevent (or suppress) the color of the second particles B from having an influence on the red display state, and it is possible to display brighter red.

Cyan Display State (Second Particle Color Display State)

Figure 5C:
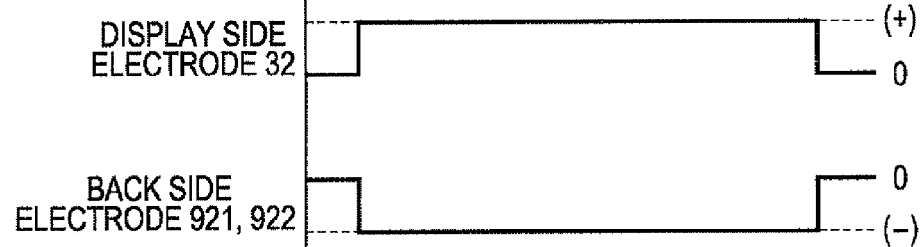
Figure 8:
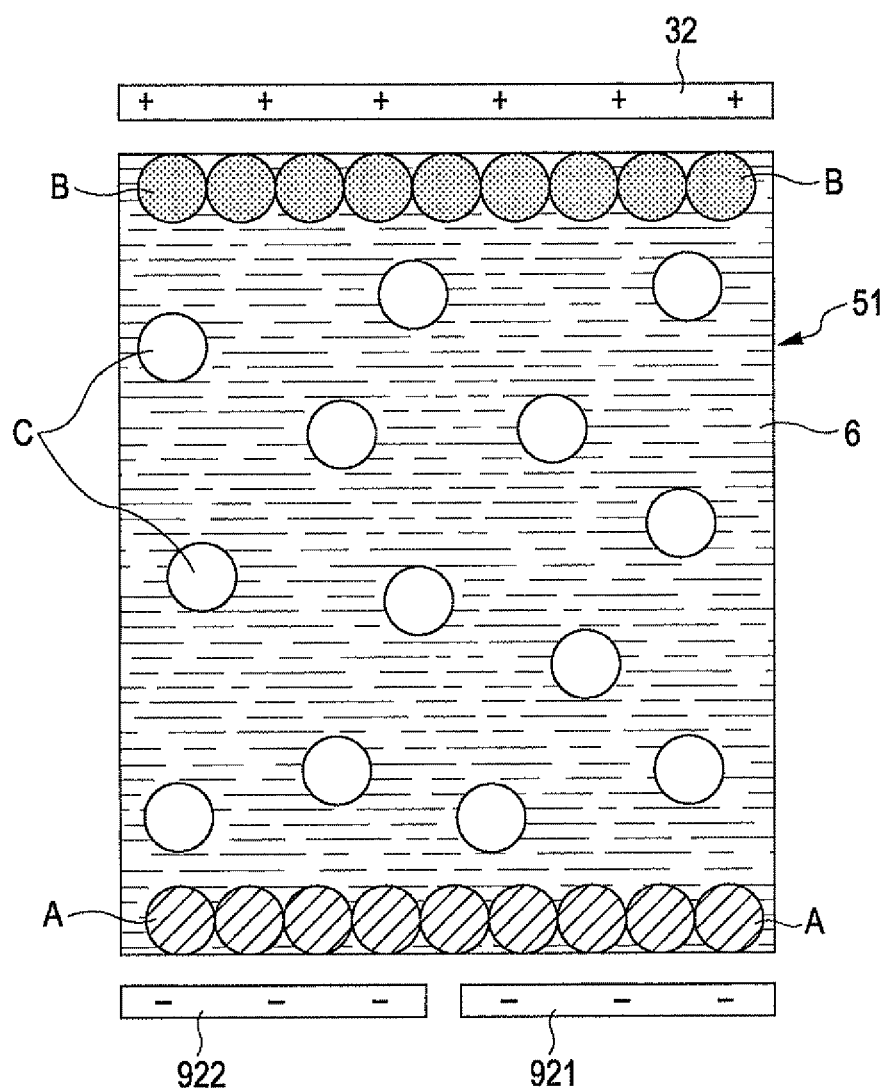
FIG. 8 is a schematic diagram illustrating an operation of the display device shown in FIG. 1.

The voltage shown in FIG. 5C is applied to three electrodes 32, 921, and 922. That is, the voltage making the display side electrode 32 have the positive potential state and making the back side electrodes 921 and 922 have the negative potential state (lower potential than the display side electrode 32) is applied. Then, as shown in FIG. 8, the positively charged first particles A move toward the back side electrodes 921 and 922 in the dispersion medium 6, and are collected on the back side electrodes 921 and 922 side. The negatively charged second particles B move toward the display side electrode 32 in the dispersion medium 6, and are collected on the display side electrode 32 side. The third particles C keep the state of being dispersed in the dispersion medium 6. Accordingly, cyan that is the color of the second particles B is displayed on the display face 1a.

The escaping energy f2 acting on the first particles A through the electric field generated by applying the voltage shown in FIG. 5C to three electrodes 32, 921, and 922 is larger than the absorption energy f1 holding the first particles A to the inner face of the cell 51, and the escaping energy f4 acting on the second particles B is also larger than the absorption energy f3 holding the second particles B to the inner face of the cell 51. Accordingly, it is possible to smoothly attain the cyan display state from any state of the states where the first particles A and the second particles B are dispersed in the dispersion medium 6, the white display state, the red display state, and the black display state to be described later.

In the cyan display state, the first particles A are collected on the back side electrodes 921 and 922, that is, a position far away from the display face 1a, and the white third particles C are dispersed between the second particle B and the first particles A. For this reason, the external light passing through the second particles B can be reflected and diffused by the third particles C before reaching the first particles A. As a result, it is possible to prevent (or suppress) the color of the first particles A from having an influence on the cyan display state, and it is possible to display brighter cyan.

Black Display State

Figure 9A:
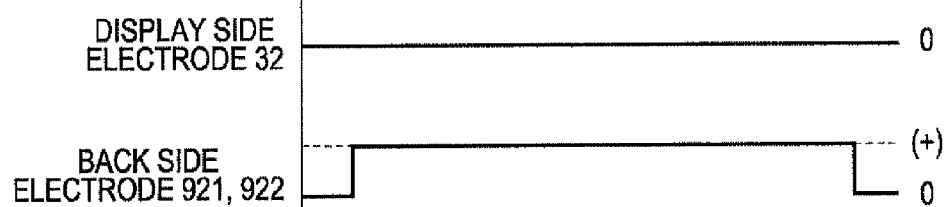
FIG. 9A and FIG. 9B are schematic diagrams illustrating operation voltages of the display device shown in FIG. 1.

First, the voltage shown in FIG. 5C is applied to make the cell 51 into the cyan display state shown FIG. 8. Then, the voltage shown in FIG. 9A is applied to three electrodes 32, 921, and 922. That is, the voltage making the back side electrodes 921 and 922 have the positive potential state (the state of a higher potential than the display side electrode 32, but a potential difference between the display side electrode 32 and the back side electrodes 921 and 922 is smaller than that of the red display state) is applied while the display side electrode 32 is made to have the ground state. Since the escaping energy f2 acting on the first particles A through the electric field generated at this time is larger than the absorption energy f1 holding the first particles A to the inner face of the cell 51, the positively charged first particles A are separated from the inner wall of the cell 51, move toward the display side electrode 32 in the dispersion medium 6, and are collected on the display side electrode 32 side. Since the escaping energy f4 acting on the second particles B is smaller than the absorption energy f3 holding the second particles B to the inner face of the cell 51, the second particles B are not separated from the inner wall of the cell 51, and stay on the display side electrode 32 side as it is even when it is separated. Accordingly, as shown in FIG. 10, the first particles A and the second particles B are collected on the display side electrode 32 side in the cell 51. As a result, black that is a mixed color of the color (red) of the first particles A and the color (cyan) of the second particles B is displayed on the display face 1a.

Changing to the voltage shown in FIG. 9A, the voltage making the display side electrode 32 have the negative potential state may be applied while the back side electrodes 921 and 922 are made to have the ground state. Even by the application of the voltage, as described above, the first particles A and the second particles B become the state where they are collected on the display side electrode 32 side in the cell 51, and black is displayed.

The back side electrodes 921 and 922 are made to have the negative potential state to be the cyan display state, and the back side electrodes 921 and 922 are made to have the positive potential state to be the black display state. However, a 0 V state may be interposed between the negative potential state and the positive potential state, and the state may be continuously changed from the negative potential state to the positive potential state.

In the plurality of second particles B, it is conceivable that particles which do not come in contact with the inner wall of the cell 51 in the cyan display state are present according to the size (the surface area of the inner face) of the cell 51, and particles with a large amount (e.g., the extent equal to the amount of charge of the first particles A) of charge as compared with the other second particles B exist according to the limit of production precision. For this reason, in the plurality of second particles B, it is conceivable that particles move toward the back side electrodes 921 and 922 when applying the voltage shown in FIG. 9A.

However, as described above, since the amount of charge of the second particles is smaller than the amount of charge of the first particles, mobility (movement distance per unit time when a predetermined strength of electric field acts) of the second particles is smaller than mobility of the first particles A. Accordingly, when the first particles A move from the back side electrodes 921 and 922 toward the display side electrode 32 and are collected on the display side electrode 32 side, the second particles B moving toward the back side electrodes 921 and 922 are still positioned on the display side electrode 32 side. For this reason, the first particles A and the second particles B are collected on the display side electrode 32 in the cell 51.

The mobility of the second particles B is preferably equal to or less than ½ of the mobility of the first particles A, and more preferably equal to or less than ¼. Accordingly, more reliably, the second particles B (the second particles B moving toward the back side electrodes 921 and 922) can be on the display side electrode 32 side (the vicinity of the display side electrode 32), with respect to the time when the first particles A complete the movement, when the first particles A are moved to the display side electrode 32 from the cyan display state.

It is preferable that the applying time of the voltage shown in FIG. 9A is substantially equal to the time taken when the first particles A move from the back side electrodes 921 and 922 to the display side electrode 32. Accordingly, it is possible to move the first particles A from the back side electrodes 921 and 922 to the display side electrode 32, and it is possible to suppress excessive movement of the second particles B (the second particles B moving toward the back side electrodes 921 and 922) to the back side electrodes 921 and 922. For this reason, it is possible to display black.

After being the black display state (i.e., the state where the first particles A and the second particles B are collected on the display side electrode 32 side in the cell 51) described above, the voltage shown in FIG. 9B may be applied to three electrodes 32, 921, and 922. That is, an alternating voltage may be applied between the display side electrode 32 and the back side electrodes 921 and 922.

Figure 9B:
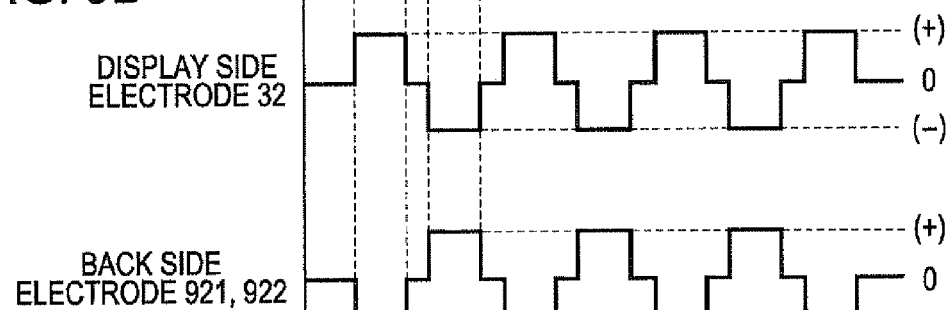

The escaping energy f2 acting on the first particles A through the electric field generated by applying the voltage shown in FIG. 9B to three electrode 32, 921, and 922 is larger than the absorption energy f1 holding the first particles A to the inner face of the cell 51, the escaping energy f4 acting on the second particles B is also larger than the absorption energy f3 holding the second particles B to the inner face of the cell 51, and thus both of the first particles A and the second particles B are moved according to the electric field.

Specifically, in the state where the display side electrode 32 is the positive potential and the back side electrode 921 and 922 are the negative potential, the first particles A move toward the back side electrodes 921 and 922, and the second particles B move toward the display side electrode 32. On the contrary, in the state where the display side electrode 32 is the negative potential and the back side electrodes 921 and 922 are the positive potential, the first particles A move toward the display side electrode 32, and the second particles B move toward the back side electrodes 921 and 922.

Accordingly, the first particles A and the second particles B vibrate in a separation direction (the thickness direction of the display layer 5) of the display side electrode 32 and the back side electrodes 921 and 922. As a result, the first particles A and the second particles B are disproportionately located on the display face 1a side in the cell 51 in a more uniformly mixed state. Accordingly, it is possible to display black with lower chroma and lower brightness as compared with before applying the alternating voltage. For this reason, the display device 1 can exhibit higher contrast.

(The waveform of) the alternating voltage is not particularly limited, but it is preferable that a period T1 when the display side electrode 32 has positive potential and the back side electrodes 921 and 922 have negative potential is equal to a period T2 when the display side electrode 32 has negative potential and the back side electrodes 921 and 922 have positive potential. Accordingly, it is possible to vibrate and mix the first particles A and the second particles B while they are positioned on the display face 1a side in the cell 51.

It is preferable that the alternating voltage has a period T3 when the display side electrode 32 and the back side electrodes 921 and 922 are the same potential (a state where a potential difference is 0) between the period T1 and the period T2. With such a period T3, it is possible to more effectively vibrate the first particles A and the second particles B. Specifically, when an electric field acts on the first particles A and the second particles B, the particles are dielectrically polarized and the dielectrically polarized particles are absorbed to each other by an electrostatic force. By interposing the period T3 between the period T1 and the period T2, the particles A and B are dielectrically polarized, the particles are separated from each other, and the particles easily move. For this reason, it is possible to effectively vibrate the first particles A and the second particles B.

According to the display device 1 described above, since black is displayed by mixing the first particles A and the second particles B, it is possible to display black with low brightness and low chroma. Since it is possible to display black without using black particles, it is possible to more brightly and clearly display the colors of the first particles A, the second particles B, and the third particles C. Since the second particles B move to the opposite side to display the color of the first particles A and the first particles A move to the opposite side to display the color of the second particles B, it is possible to more brightly and clearly display the colors of the first particles A and the second particles B, from this viewpoint. Accordingly, the display device 1 can exhibit high contrast, and display clear colors.

Second Embodiment

Next, a display device according to a second embodiment of the invention will be described.

Figure 11:
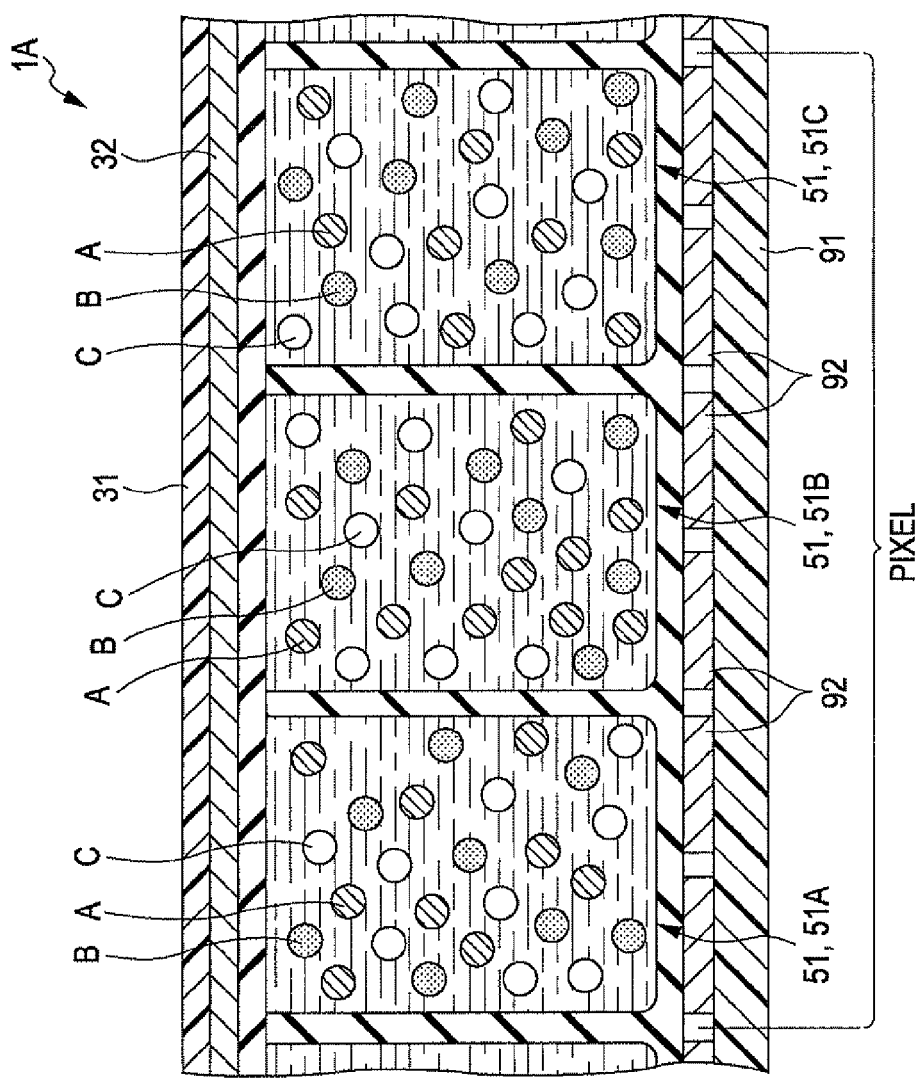
FIG. 11 is a cross-sectional view schematically illustrating a display device according to a second embodiment of the invention.

FIG. 11 is a cross-sectional view schematically illustrating the display device according to the second embodiment of the invention.

Hereinafter, the display device according to the second embodiment will be described, but differences from the above-described embodiment are mainly described, and the description of the same contents is omitted.

The display device 1A according to the embodiment has the same configuration as that of the above-described first embodiment, except for the number of cells constituting one pixel.

As shown in FIG. 11, in the display device 1A of the embodiment, one pixel is formed of three cells 51 (the first cell 51A, the second cell 51B, and the third cell 51C).

In the first cell 51A, the color of the first particles A is red, and the color of the second particles B is cyan which has a complementary relation with red. In the second cell 51B, the color of the first particles A is green, and the color of the second particles B is magenta which has complementary relation with red. In the third cell 51C, the color of the first particles A is blue, and the color of the second particles B is yellow which has a complementary relation with blue. One pixel is formed of the first cell 51A, the second cell 51B, and the third cell 51C, and thus the display device 1A can realize the full color display.

Specifically, as described in the first embodiment, the first cell 51A can take the four states of a black display state, a white display state, a red display state, and a cyan display state. Similarly, the second cell 51B can take four states of a black display state, a white display state, a green display states, and a magenta display state, and the third cell 51C can take the four states of a black display state, a white display state, a blue display state, and a yellow display state. It is possible to display full color on the pixel by controlling (selecting) the composition of the state of the first cell 51A, the state of the second cell 51B, and the state of the third cell 51C.

The composition of the colors of the first particles A and the second particles B may be reversed for each cell 51. That is, in the cell 51A, the first particles A may be cyan, and the second particles B may be red. In the cell 51B, the first particles A may be magenta, and the second particles B may be green. In the cell 51C, the first particles A may be yellow, and the second particles B may be blue.

The specific operation of the display device 1A is as shown in Table 1 and Table 2. "W" in Table 1 and Table 2 means the white display state, "BK" means the black display state, "R" means the red display state, "G" means the green display state, "B" means the blue display state, "C" means the cyan display state, "M" means the magenta display state, and "Y" means the yellow display state. Table 1 and Table 2 are an example, and the color which can be displayed by the display device 1A is not limited thereto.

TABLE 1

| | | DISPLAY COLOR | | |
|---|---|---|---|---|
| | FIRST CELL 51A | SECOND CELL 51B | THIRD CELL 51C | PATTERN |
| WHITE DISPLAY | W | W | W | W1 |
| | R | G | B | W2 |
| | C | M | Y | W3 |
| RED DISPLAY | R | W | W | R1 |
| | R | W | BK | R2 |
| | R | BK | W | R3 |
| | R | BK | BK | R4 |
| | R | M | Y | R5 |
| | W | M | Y | R6 |
| | BK | M | Y | R7 |
| GREEN DISPLAY | W | G | W | G1 |
| | W | G | BK | G2 |
| | BK | G | W | G3 |
| | BK | G | BK | G4 |
| | C | G | Y | G5 |
| | C | W | Y | G6 |
| | C | BK | Y | G7 |
| BLUE DISPLAY | W | W | B | B1 |
| | W | BK | B | B2 |
| | BK | W | B | B3 |
| | BK | BK | B | B4 |
| | C | M | B | B5 |
| | C | M | W | B6 |
| | C | M | BK | B7 |

TABLE 2

| | DISPLAY COLOR | | |
|---|---|---|---|
| | FIRST CELL 51A | SECOND CELL 51B | THIRD CELL 51C | PATTERN |
| CYAN DISPLAY | C | W | W | C1 |
| | C | W | BK | C2 |
| | C | BK | W | C3 |
| | C | BK | BK | C4 |
| | C | G | B | C5 |
| | W | G | B | C6 |
| | BK | G | B | C7 |
| MAGENTA DISPLAY | W | M | W | M1 |
| | W | M | BK | M2 |
| | BK | M | W | M3 |
| | BK | M | BK | M4 |
| | R | M | B | M5 |
| | R | W | B | M6 |
| | R | BK | B | M7 |
| YELLOW DISPLAY | W | W | Y | Y1 |
| | W | BK | Y | Y2 |
| | BK | W | Y | Y3 |
| | BK | BK | Y | Y4 |
| | R | G | Y | Y5 |
| | R | G | W | Y6 |
| | R | G | BK | Y7 |
| BLACK DISPLAY | BK | BK | BK | BK1 |
| GRAY DISPLAY | BK | W | W | GR1 |
| | W | BK | W | GR2 |
| | W | W | BK | GR3 |
| | BK | BK | W | GR4 |
| | BK | W | BK | GR5 |
| | W | BK | BK | GR6 |

White Display

As shown in Table. 1, there are at least three patterns displaying white on the pixel. Specifically, there are a pattern (W1) in which the cells 51A, 51B, and 51C are in the white display state, a pattern (W2) in which the first cell 51A is in the red display state, the second cell 51B is in the green display state, and the third cell 51C is in the blue display state, and a pattern (W3) in which the first cell 51A is in the cyan display state, the second cell 51B is in the magenta display state, and the third cell 51C is in the yellow display state.

Among three patterns (W1) to (W3), the pattern (W1) is most preferable from the viewpoint of the capability of displaying the clearest and brightest white (i.e., the white with the highest reflectance). That is, it is possible to display an image with high contrast by displaying white in the pattern (W1).

Red Display

As shown in Table 1, there are at least seven patterns displaying red on the pixel. Specifically, there are a pattern (R1) in which the first cell 51A is in the red display state, and the second cell 51B and the third cell 51C are in the white display state, patterns (R2) and (R3) in which the first cell 51A is in the red display state, any one of the second cell 51B and the third cell 51C is in the white display state and the other is in the black display state, a pattern (R4) in which the first cell 51A is in the red display state, and the second cell 51B and the third cell 51C are in the black display state, a pattern (R5) in which the first cell 51A is in the red display state, the second cell 51B is in the magenta display state, and the third cell 51C is in the yellow display state, a pattern (R6) in which the first cell 51A is in the white display state, the second cell 51B is in the magenta display state, and the third cell 51C is in the yellow display state, and a pattern (R7) in which the first cell 51A is in the black display state, the second cell 51B is in the magenta display state, and the third cell 51C is in the yellow display state.

Among the patterns (R1) to (R4), the pattern (R1) can display the brightest red, and the pattern (R4) can display the darkest red. The pattern (R2) and the pattern (R3) can display red with a brightness between the pattern (R1) and the pattern (R4).

The pattern (R5) can display red with superior (i.e., the deepest) color tone among the seven patterns. Specifically, the mixed color of magenta displayed by the second cell 51B and yellow displayed by the third cell 51C is red. For this reason, red displayed by the first cell 51A and red displayed by the second and third cells 51B and 51C are combined to be red with a superior color tone.

Green Display

As shown in Table 1, similarly to the above describe red display patterns, there are at least seven patterns displaying green on the pixel. Specifically, there are a pattern (G1) in which the second cell 51B is in the green display state, and the first cell 51A and the third cell 51C are in the white display state, patterns (G2) and (G3) in which the second cell 51B is in the green display state, any one of the first cell 51A and the third cell 51C is in the white display state and the other is in the black display state, a pattern (G4) in which the second cell 51B is in the green display state, and the first cell 51A and the third cell 51C are in the black display state, a pattern (G5) in which the second cell 51B is in the green display state, the first cell 51A is in the cyan display state, and the third cell 51C is in the yellow display state, a pattern (G6) in which the second cell 51B is in the white display state, the first cell 51A is in the cyan display state, and the third cell 51C is in the yellow display state, and a pattern (G7) in which the second cell 51B is in the black display state, the first cell 51A is in the cyan display state, and the third cell 51C is in the yellow display state.

Among the patterns (G1) to (G4), the pattern (G1) can display the brightest green, and the pattern (G4) can display the darkest green. The pattern (G2) and the pattern (G3) can display green with a brightness between the pattern (G1) and the pattern (G4).

The pattern (G5) can display green with superior (i.e., the deepest) color tone among the seven patterns. Specifically, the mixed color of cyan displayed by the first cell 51A and yellow displayed by the third cell 51C is green. For this reason, green displayed by the second cell 51B and green displayed by the first and third cells 51A and 51C are combined to be green with a superior color tone.

Blue Display

As shown in Table 1, similarly to the above described red display patterns, there are at least seven patterns displaying blue on the pixel. Specifically, there are a pattern (B1) in which the third cell 51C is in the blue display state, and the first cell 51A and the second cell 51B are in the white display state, patterns (32) and (B3) in which the third cell 51C is in the blue display state, any one of the first cell 51A and the second cell 51B is in the white display state and the other is in the black display state, a pattern (B4) in which the third cell 51C is in the blue display state, and the first cell 51A and the second cell 51B are in the black display state, a pattern (B5) in which the third cell 51C is in the blue display state, the first cell 51A is in the cyan display state, and the second cell 51B is in the magenta display state, a pattern (B6) in which the third cell 51C is in the white display state, the first cell 51A is in the cyan display state, and the second cell 51B is in the magenta display state, and a pattern (B7) in which the third cell 51C is in the black display state, the first cell 51A is in the cyan display state, and the second cell 51B is in the magenta display state.

Among the patterns (B1) to (B4), the pattern (B1) can display the brightest blue, and the pattern (B4) can display the darkest blue. The pattern (B2) and the pattern (B3) can display blue with a brightness between the pattern (B1) and the pattern (B4).

The pattern (B5) can display blue with superior (i.e., the deepest) color tone among the seven patterns. Specifically, the mixed color of cyan displayed by the first cell 51A and magenta displayed by the second cell 51B is blue. For this reason, blue displayed by the third cell 51C and blue displayed by the first and second cells 51A and 51B are combined to be blue with a superior color tone.

Cyan Display

As shown in Table 2, similarly to the above described red display patterns, there are at least seven patterns displaying cyan on the pixel. Specifically, there are a pattern (C1) in which the first cell 51A is in the cyan display state, and the second cell 51B and the third cell 51C are in the white display state, patterns (C2) and (C3) in which the first cell 51A is in the cyan display state, any one of the second cell 51B and the third cell 51C is in the white display state and the other is in the black display state, a pattern (C4) in which the first cell 51A is in the cyan display state, and the second cell 51B and the third cell 51C are in the black display state, a pattern (C5) in which the first cell 51A is in the cyan display state, the second cell 51B is in the green display state, and the third cell 51C is in the blue display state, a pattern (C6) in which the first cell 51A is in the white display state, the second cell 51B is in the green display state, and the third cell 51C is in the blue display state, and a pattern (C7) in which the first cell 51A is in the black display state, the second cell 51B is in the green display state, and the third cell 51C is in the blue display state.

Among the patterns (C1) to (C4), the pattern (C1) can display the brightest cyan, and the pattern (C4) can display the darkest cyan. The pattern (C2) and the pattern (C3) can display cyan with a brightness between the pattern (C1) and the pattern (C4).

The pattern (C5) can display cyan with superior (i.e., the deepest) color tone among the seven patterns. Specifically, the mixed color of green displayed by the second cell 51B and blue displayed by the third cell 51C is cyan. For this reason, cyan displayed by the first cell 51A and cyan displayed by the second and third cells 51B and 51C are combined to be cyan with a superior color tone.

Magenta Display

As shown in Table 2, similarly to the above described red display patterns, there are at least seven patterns displaying magenta on the pixel. Specifically, there are a pattern (M1) in which the second cell 51B is in the magenta display state, and the first cell 51A and the third cell 51C are in the white display state, patterns (M2) and (M3) in which the second cell 51B is in the magenta display state, any one of the first cell 51A and the third cell 51C is in the white display state and the other is in the black display state, a pattern (M4) in which the second cell 51B is in the magenta display state, and the first cell 51A and the third cell 51C are in the black display state, a pattern (M5) in which the second cell 51B is in the magenta display state, the first cell 51A is in the red display state, and the third cell 51C is in the blue display state, a pattern (M6) in which the second cell 51B is in the white display state, the first cell 51A is in the red display state, and the third cell 51C is in the blue display state, and a pattern (M7) in which the second cell 51B is in the black display state, the first cell 51A is in the red display state, and the third cell 51C is in the blue display state.

Among the patterns (M1) to (M4), the pattern (M1) can display the brightest magenta, and the pattern (M4) can display the darkest magenta. The pattern (M2) and the pattern (M3) can display magenta with a brightness between the pattern (M1) and the pattern (M4).

The pattern (M5) can display magenta with superior (i.e., the deepest) color tone among the seven patterns. Specifically, the mixed color of red displayed by the first cell 51A and blue displayed by the third cell 51C is magenta. For this reason, magenta displayed by the second cell 51B and magenta displayed by the first and third cells 51A and 51C are combined to be magenta with a superior color tone.

Yellow Display

As shown in Table 2, similarly to the above described red display patterns, there are at least seven patterns displaying yellow on the pixel. Specifically, there are a pattern (Y1) in which the third cell 51C is in the yellow display state, and the first cell 51A and the second cell 51B are in the white display state, patterns (Y2) and (Y3) in which the third cell 51C is in the yellow display state, any one of the first cell 51A and the second cell 51B is in the white display state and the other is in the black display state, a pattern (Y4) in which the third cell 51C is in the yellow display state, and the first cell 51A and the second cell 51B are in the black display state, a pattern (Y5) in which the third cell 51C is in the yellow display state, the first cell 51A is in the red display state, and the second cell 51B is in the green display state, a pattern (Y6) in which the third cell 51C is in the white display state, the first cell 51A is in the red display state, and the second cell 51B is in the green display state, and a pattern (Y7) in which the third cell 51C is in the black display state, the first cell 51A is in the red display state, and the second cell 51B is in the green display state.

Among the patterns (Y1) to (Y4), the pattern (Y1) can display the brightest yellow, and the pattern (Y4) can display the darkest yellow. The pattern (Y2) and the pattern (Y3) can display yellow with a brightness between the pattern (Y1) and the pattern (Y4).

The pattern (Y5) can display yellow with superior (i.e., the deepest) color tone among the seven patterns. Specifically, the mixed color of red displayed by the first cell 51A and green displayed by the second cell 51B is yellow. For this reason, yellow displayed by the third cell 51C and yellow displayed by the first and second cells 51A and 51B are combined to be yellow with a superior color tone.

Black Display

As shown in Table 2, there are at least one pattern displaying black on the pixel. Specifically, there is a pattern (BK1) in which the cells 51A, 51B, and 51C are in the black display state.

Gray Display

As shown in Table 2, there is at least six patterns displaying gray on the pixel. Specifically, there are patterns (GR1), (GR2), and (GR3) in which any one cell of the first cell 51A, the second cells 51B, and the third cell 51C is in the black display state, and the other two cells are in the white display state, and patterns (GR4), (GR5), and (GR6) in which any one cell of the first cell 51A, the second cells 51B, and the third cell 51C is in the white display state, and the other two cells are in the black display state.

Among the patterns (GR1) to (GR6), the patterns (GR1), (GR2), and (GR3) are grays which are close to white, and the patterns (GR4), (GR5), and (GR6) are grays which are close to black.

Display State of Other Colors

Although not shown in Table 1 and Table 2, colors other than the above-described colors may be displayed on the pixel. For example, to display a mixed color of red and green, the first cell 51A may be in the red display state, the second cell 51B may be in the green display state, and the third cell 51C may be in the white display state or the black display state. To display a mixed color of green and blue, the second cell 51B may be in the green display state, the third cell 51C may be in the blue display state, and the first cell 51A may be in the white display state or the black display state. To display a mixed color of blue and red, the third cell 51C may be in the blue display state, the first cell 51A may be in the red display state, and the second cell 51B may be in the white display state or the black display state. In addition, to display a mixed color of cyan and magenta, the first cell 51A may be in the cyan display state, the second cell 51B may be in the magenta display state, and the third cell 51C may be in the white display state or the black display state. To display a mixed color of magenta and yellow, the second cell 51B may be in the magenta display state, the third cell 51C may be in the yellow display state, and the first cell 51A may be in the white display state or the black display state. To display a mixed color of yellow and cyan, the third cell 51C may be in the yellow display state, the first cell 51A may be in the cyan display state, and the second cell 51B may be in the white display state or the black display state.

Also, according to the second embodiment, it is possible to exhibit the same effect as that of the first embodiment.

Electronic Apparatus

The display device 1 described above may be mounted on various electronic apparatuses. Hereinafter, an electronic apparatus of the invention provided with the display device 1 will be described.

Electronic Paper

First, an embodiment in which the electronic apparatus of the invention is applied to an electronic paper will be described.

Figure 12:
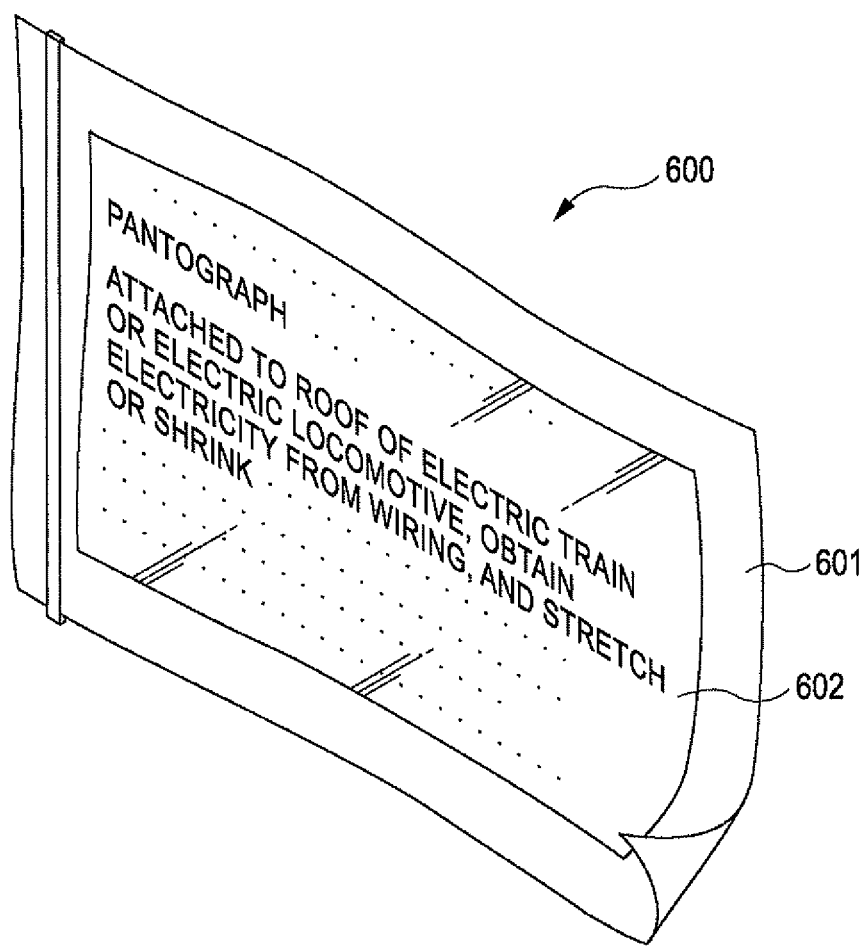
FIG. 12 is a perspective view illustrating an electronic paper to which an electronic apparatus according to an embodiment of the invention is applied.

FIG. 12 is a perspective view illustrating the embodiment in which the electronic apparatus is applied to the electronic paper.

The electronic paper 600 shown in FIG. 12 is provided with a main body 601 formed of a rewritable sheet having the feel of a material and flexibility such as paper, and a display unit 602.

In such an electronic paper 600, the display unit 602 is formed of the display device 1 described above.

Display

Next, an embodiment in which the electronic apparatus of the invention is applied to a display will be described.

Figure 13A:
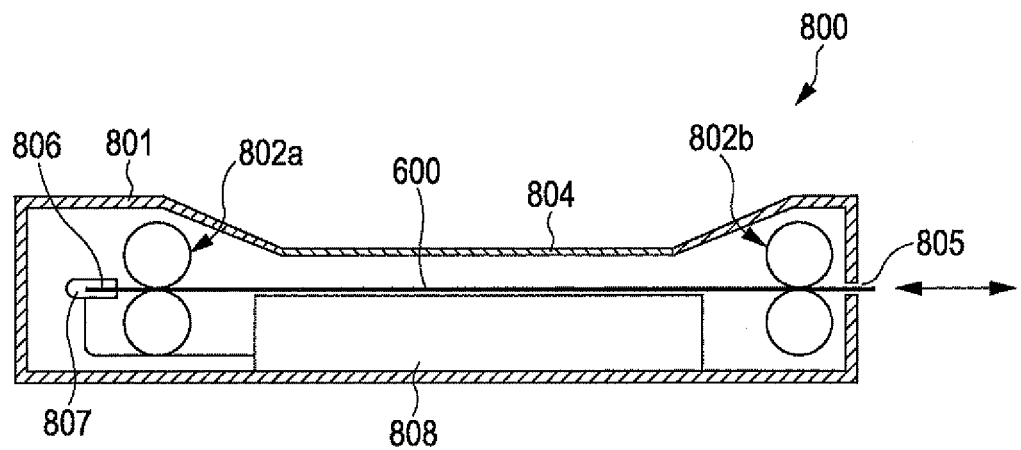
FIG. 13A and FIG. 13B are diagrams illustrating a display to which an electronic apparatus according to an embodiment of the invention is applied.
Figure 13B:
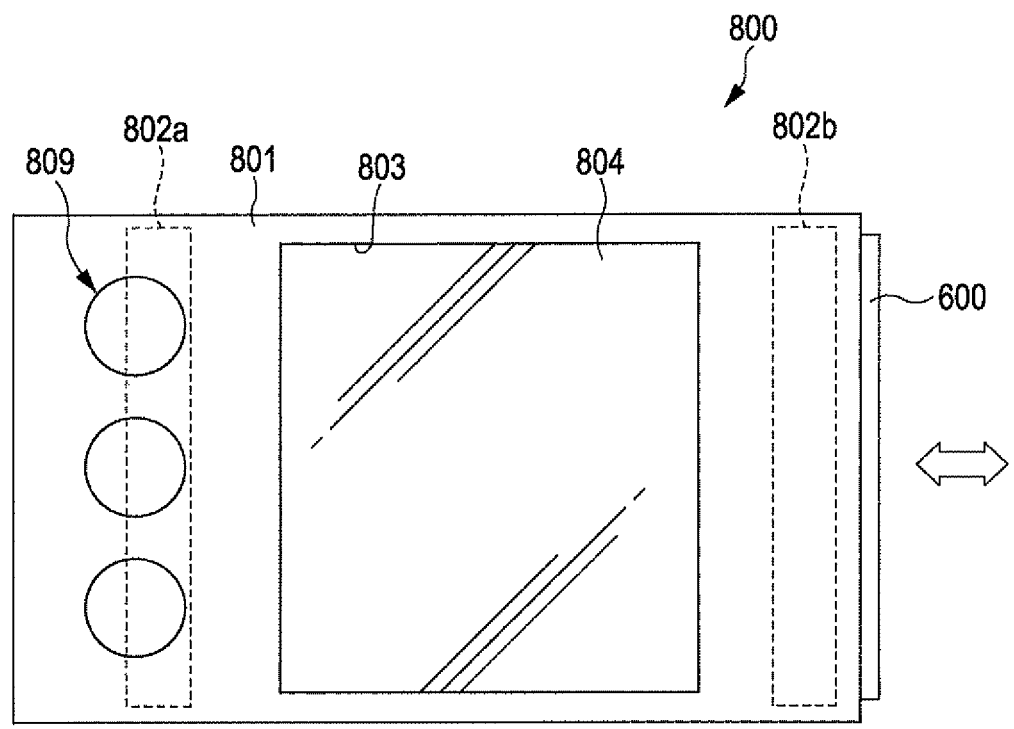

FIG. 13A and FIG. 13B are diagrams illustrating the embodiment in which the electronic apparatus is applied to the display. FIG. 13A is a cross-sectional view, and FIG. 13B is a plan view.

The display (display device) 800 shown in FIG. 13A and FIG. 13B is provided with a main body 801, and an electronic paper 600 provided attachably to and detachably from the main body 801. The electronic paper 600 has the same configuration as that described above, that is, the configuration shown in FIG. 12.

The main body 801 is provided with an insertion hole 805 to which the electronic paper 600 can be inserted on a side portion (right side in FIG. 13A), and is provided therein with two sets of transport rollers 802a and 802b. When the electronic paper 600 is inserted into the main body 801 through the insertion hole 805, the electronic paper 600 is mounted on the main body 801 with the electronic paper 600 pinched between the transport rollers 802a and 802b.

A rectangular hole portion 803 is formed on the display side (paper front side in FIG. 13B) of the main body 801, and a transparent glass plate 804 is put into the hole portion 803. Accordingly, it is possible to view the electronic paper 600 mounted on the main body 801 from the outside of the main body 801. That is, in the display 800, the electronic paper 600 mounted on the main body 801 is made visible on the transparent glass plate 804, thereby configuring the display face.

The insertion-direction leading portion (left side in FIG. 13A and FIG. 13B) of the electronic paper 600 is provided with a terminal portion 806, and the main body 801 is provided therein with a socket 807 to which the terminal portion 806 is connected with the electronic paper 600 mounted on the main body 801. The socket 807 is electrically connected to a controller 808 and an operation unit 809.

In the display 800, the electronic paper 600 is provided attachably to and detachably from the main body 801, and may be portably carried and used in a state where it is detached from the main body 801.

In the display 800, the electronic paper 600 is formed of the display device 1 described above.

The electronic apparatus is not limited to the applications described above, and may be, for example, a television, a viewfinder type or monitor direct-view type video tape recorder, a car navigation device, a pager, an electronic scheduler, a calculator, an electronic newspaper, a word processor, a personal computer, a workstation, a video phone, a POS terminal, and an apparatus provided with a touch panel, and the display device 1 may be applied to a display unit of any of these various kinds of electronic apparatuses.

The display device and the electronic apparatus of the invention have been described above according to the embodiments with reference to the drawings, but the invention is not limited thereto, and the configuration of each unit may be replaced by an arbitrary configuration having the same function. Any other configurations may be added to the invention. In a method of producing the display device of the invention, any two or more configurations may be combined among the embodiments.

In the above-described embodiments, the cells are substantially rectangular in the plan view of the display layer, and are arranged in a matrix. However, the shape and disposition of the cells are not limited thereto, for example, the cells may be substantially hexagonal in the plan view of the display layer and arranged in a honeycomb shape.

In the above-described embodiments, the white third particles are the uncharged particles which are not substantially charged. However, the third particles may be charged particles having positive or negative charge if they are dispersed in the cells in a state where an electric field does not act. The third particles may be not white, and may be, for example, a metallic color such as gold, silver, and copper.

In the above-described embodiments, the display device is a so-called partition-type (cell-type) display device, but is not limited thereto. A so-called microcapsule-type display device may be used.

The entire disclosure of Japanese Patent Application No. 2010-147895, filed Jun. 29, 2010 is expressly incorporated by reference herein.

What is claimed is:

1. A display device comprising:
a display layer that is provided with a cell in which first particles, second particles, and third particles with different colors from one another are contained;
a front side electrode that is provided on the front side of the display layer; and
a first back side electrode and a second back side electrode that are provided corresponding to the cell on the back side of the display layer,
wherein the first particles are positively or negatively charged, wherein the second particles have 1) a color with a complementary color relation to that of the first particles, 2) an opposite polarity charge to that of the first particles, and 3) a smaller amount of charge than that of the first particles, and a voltage application pattern to the front side electrode, the first back side electrode, and the second back side electrode is selected and the selected voltage pattern is applied, and then the first particles and the second particles are disproportionately located with the third particles are dispersed in the cell, to change a displayed color from the front side, wherein a voltage with the same polarity as that of the first particles is applied to the front side electrode or a voltage with the same polarity as that of the second particles is applied to at least one of the first back side electrode and the second back side electrode, to disproportionately locate the second particles on the front side of the cell and to disproportionately locate the first particles on the back side of the cell, thereby being in a second particle color display state where the color of the second particles is viewed from the front side, a voltage with the opposite polarity to that of the first particles is applied to the first back side electrode and the second back side electrode in the second particle color display state, to move the first particles to the display side of the cell with the second particles disproportionately located on the front side of the cell, and to disproportionately locate the first particles and the second particles on the front side of the cell, thereby being in a black display state where black that is a mixed color of the first particles and the second particles is viewed from the front side, and the first particles and the second particles are disproportionately located on the front side of the cell, and then an alternating voltage is applied between the front side electrode and the first back side electrode and the second back side electrode, to vibrate the first particles and the second particles in the thickness direction of the display layer, thereby being in a mixed state where the first particles and the second particles are mixed.

2. The display device according to claim 1, wherein the third particles are neither positively nor negatively charged.

3. The display device according to claim 1, wherein the first back side electrode is made to have a higher potential than the front side electrode and the second back side electrode is made to have a lower potential than the front side electrode, to disproportionately locate the first particles and the second particles on the back side of the cell, thereby being in a third particle color display state where the color of the third particles is viewed from the front side.

4. The display device according to claim 1, wherein a voltage with the opposite polarity to that of the first particles is applied to the front side electrode or a voltage with the opposite polarity to that of the second particles is applied to at least one of the first back side electrode and the second back side electrode, to disproportionately locate the first particles on the front side of the cell and to disproportionately locate the second particles on the back side of the cell, being in a first particle color display state where the color of the first particles is viewed from the front side.

5. The display device according to claim 4, wherein magnitude of electric field occurring in the first particle color display state is larger than attraction force that electrostatic force acting on the first particles through the electric field holds the first particles to an inner face of the cell, and is larger than attraction force that electrostatic force acting on the second particles holds the second particles to the inner face of the cell.

6. The display device according to claim 1, wherein magnitude of electric field occurring in the second particle color display state is larger than attraction force that electrostatic force acting on the first particles through the electric field holds the first particles to an inner face of the cell, and is larger than attraction force that electrostatic force acting on the second particles holds the second particles to the inner face of the cell.

7. The display device according to claim 1, wherein magnitude of electric field acting on the first particles and the second particles in the black display state is smaller than that of an electric field acting on the first particles and the second particles in the second particle color display state.

8. The display device according to claim 1, wherein magnitude of electric field occurring in the black display state is larger than attraction force that electrostatic force acting through the electric field holds the first particles to an inner face of the cell, and is smaller than attraction force that electrostatic force acting on the second particles holds the second particles to the inner face of the cell.

9. The display device according to claim 1, wherein magnitude of electric field occurring in the mixed state is larger than attraction force that electrostatic force acting on the first particles through the electric field holds the first particles to an inner face of the cell, and is larger than attraction force that electrostatic force acting on the second particles holds the second particles to the inner face of the cell.

10. The display device according to claim 1, wherein the color of the first particles is cyan, magenta, yellow, red, green, or blue.

11. The display device according to claim 1, wherein the color of the third particles is white.

12. The display device according to claim 1, wherein one pixel comprises at least three cells, each cell of the at least three cells containing the first particles and the second particles having a combination of colors, and wherein a first one of the cells contains particles having a combination of colors: red and cyan, a second one of the cells contains particles having a combination of colors: green and magenta, and a third one of the cells contains particles having a combination of colors: yellow and blue.

13. An electronic apparatus comprising the display device according to claim 1.

14. A display device comprising:

a display layer that is provided with a cell in which first particles, second particles, and third particles are contained;

a front side electrode that is provided on one side of the display layer; and a first back side electrode and a second back side electrode that are provided on the other side of the display layer, wherein the first particles are positively charged, wherein the second particles have a color with a complementary color relation to that of the first particles, are negatively charged, and have a smaller amount of charge than that of the first particles, wherein the third particles are different in color from the first particles and the second particles, wherein the front side electrode is made to have a higher potential than those of the first back side electrode and the second back side electrode, to be in a first state of disproportionately locating the first particles to the other side of the cell and disproportionately locating the second particles to the one side of the cell, and wherein the front side electrode is made to have a lower potential than those of the first back side electrode and the second back side electrode, and the difference in potential between the front side electrode and the first back side electrode and the second back side electrode is made smaller than that of the first state, to be in a second state of disproportionately locating the first particles to the one side of the cell with the second particles disproportionately located to the one side of the cell, wherein a voltage with the same polarity as that of the first particles is applied to the front side electrode or a voltage with the same polarity as that of the second particles is applied to at least one of the first back side electrode and the second back side electrode, to disproportionately locate the second particles on the front side of the cell and to disproportionately locate the first particles on the back side of the cell, thereby being in a second particle color display state where the color of the second particles is viewed from the front side, a voltage with the opposite polarity to that of the first particles is applied to the first back side electrode and the second back side electrode in the second particle color display state, to move the first particles to the display side of the cell with the second particles disproportionately located on the front side of the cell, and to disproportionately locate the first particles and the second particles on the front side of the cell, thereby being in a black display state where black that is a mixed color of the first particles and the second particles is viewed from the front side, and the first particles and the second particles are disproportionately located on the front side of the cell, and then an alternating voltage is applied between the front side electrode and the first back side electrode and the second back side electrode, to vibrate the first particles and the second particles in the thickness direction of the display layer, thereby being in a mixed state where the first particles and the second particles are mixed.

15. An electronic apparatus comprising the display device according to claim 14.

16. A display device comprising:
a display layer that is provided with a cell in which first particles, second particles, and third particles are contained;
a front side electrode that is provided on one side of the display layer; and
a first back side electrode and a second back side electrode that are provided on the other side of the display layer,
wherein the first particles are negatively charged,
wherein the second particles have a color with a complementary color relation to that of the first particles, are positively charged, and have a smaller amount of charge than that of the first particles, wherein the third particles are different in color from the first particles and the second particles, wherein the front side electrode is made to have a lower potential than those of the first back side electrode and the second back side electrode, to be in a first state of disproportionately locating the first particles to the other side of the cell and disproportionately locating the second particles to the one side of the cell, and wherein the front side electrode is made to have a higher potential than those of the first back side electrode and the second back side electrode, and a difference in potential between the front side electrode and the first back side electrode and the second back side electrode is made smaller than that of the first state, to be in a second state of disproportionately locating the first particles to the one side of the cell with the second particles disproportionately located to the one side of the cell, wherein a voltage with the same polarity as that of the first particles is applied to the front side electrode or a voltage with the same polarity as that of the second particles is applied to at least one of the first back side electrode and the second back side electrode, to disproportionately locate the second particles on the front side of the cell and to disproportionately locate the first particles on the back side of the cell, thereby being in a second particle color display state where the color of the second particles is viewed from the front side, a voltage with the opposite polarity to that of the first particles is applied to the first back side electrode and the second back side electrode in the second particle color display state, to move the first particles to the display side of the cell with the second particles disproportionately located on the front side of the cell, and to disproportionately locate the first particles and the second particles on the front side of the cell, thereby being in a black display state where black that is a mixed color of the first particles and the second particles is viewed from the front side, and the first particles and the second particles are disproportionately located on the front side of the cell, and then an alternating voltage is applied between the front side electrode and the first back side electrode and the second back side electrode, to vibrate the first particles and the second particles in the thickness direction of the display layer, thereby being in a mixed state where the first particles and the second particles are mixed.

17. An electronic apparatus comprising the display device according to claim 16.

* * * * *